(12) United States Patent
Levi et al.

(10) Patent No.: US 12,058,309 B2
(45) Date of Patent: Aug. 6, 2024

(54) APPLICATION ACCELERATOR

(71) Applicant: Mellanox Technologies, Ltd., Yokneam (IL)

(72) Inventors: Dotan David Levi, Kiryat Motzkin (IL); Assaf Weissman, Moreshet (IL); Kobi Pines, Yahad (IL); Noam Bloch, Bat Shlomo (IL); Erez Yaacov, Kibbutz Sarid (IL); Ariel Naftali Cohen, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 7 days.

(21) Appl. No.: 16/291,023

(22) Filed: Mar. 4, 2019

(65) Prior Publication Data

US 2020/0014918 A1 Jan. 9, 2020

Related U.S. Application Data

(60) Provisional application No. 62/695,063, filed on Jul. 8, 2018, provisional application No. 62/726,446, filed on Sep. 4, 2018.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/147* (2014.11)

(58) Field of Classification Search
CPC .. H04N 19/105; H04N 19/139; H04N 19/176; H04N 19/147
(Continued)

(56) References Cited

U.S. PATENT DOCUMENTS 4,783,698 A 11/1988 Harney
5,949,441 A 9/1999 Ristau
(Continued)

FOREIGN PATENT DOCUMENTS

CN 107113422 A 8/2017
EP 3151560 A1 4/2017
GB 2547754 A 8/2017

OTHER PUBLICATIONS

CN Application # 2019106022492 Office Action dated Aug. 3, 2022.
(Continued)

*Primary Examiner* — Christopher S Kelley
*Assistant Examiner* — Asmamaw G Tarko
(74) *Attorney, Agent, or Firm* — KLIGLER & ASSOCIATES PATENT ATTORNEYS LTD.

(57) ABSTRACT

A system including an acceleration device including input circuitry configured, for each of a first plurality of video frames to be encoded, to receive an input including at least one raw video frame and at least one reference frame, and to divide each of the first plurality of video frames to be encoded into a second plurality of blocks, and similarity computation circuitry configured, for each one of the first plurality of video frame to be encoded: for each the block of the second plurality of blocks, to produce a score of result blocks based on similarity of each the block in each frame to be encoded to every block of the reference frame, and a displacement vector. Related apparatus and methods are also provided.

22 Claims, 23 Drawing Sheets

(51) Int. Cl.
*H04N 19/147* (2014.01)
*H04N 19/176* (2014.01)

(58) Field of Classification Search
USPC .................................................. 375/240.16
See application file for complete search history.

(56) References Cited

U.S. PATENT DOCUMENTS

| | | | |
|---|---|---|---|
| 6,075,900 A | 6/2000 | Sakazawa et al. | |
| 6,151,360 A | 11/2000 | Kato et al. | |
| 7,733,464 B2 | 6/2010 | David et al. | |
| 7,881,496 B2 | 2/2011 | Camilleri et al. | |
| 7,936,818 B2 | 5/2011 | Jayant et al. | |
| 8,498,493 B1* | 7/2013 | Choudhary | H04N 19/523 375/240.16 |
| 8,682,108 B2 | 3/2014 | Tian et al. | |
| 8,737,469 B1 | 5/2014 | Huang et al. | |
| 9,270,299 B2 | 2/2016 | Luby et al. | |
| 9,367,746 B2 | 6/2016 | Ishihara | |
| 9,767,529 B1 | 9/2017 | Liu et al. | |
| 10,136,131 B2 | 11/2018 | Zheludkov | |
| 10,200,719 B2 | 2/2019 | Zhang et al. | |
| 2002/0015446 A1 | 2/2002 | Miyaji et al. | |
| 2002/0041089 A1 | 4/2002 | Yasui | |
| 2003/0152148 A1 | 8/2003 | Laksono | |
| 2004/0146203 A1 | 7/2004 | Yoshimura et al. | |
| 2004/0165091 A1 | 8/2004 | Takemura et al. | |
| 2005/0220353 A1* | 10/2005 | Karczewicz | G06T 3/4007 375/E7.26 |
| 2005/0276323 A1 | 12/2005 | Martemyanov et al. | |
| 2006/0017843 A1* | 1/2006 | Shi | H04N 5/145 348/441 |
| 2006/0129909 A1 | 6/2006 | Butt et al. | |
| 2006/0180670 A1 | 8/2006 | Acosta et al. | |
| 2006/0256851 A1 | 11/2006 | Wang et al. | |
| 2007/0110160 A1* | 5/2007 | Wang | H04N 19/57 375/240.16 |
| 2007/0140591 A1 | 6/2007 | Kurata | |
| 2007/0147496 A1 | 6/2007 | Sherigar et al. | |
| 2007/0153008 A1 | 7/2007 | Song et al. | |
| 2007/0211157 A1 | 9/2007 | Humpoletz et al. | |
| 2007/0296849 A1 | 12/2007 | Sano et al. | |
| 2008/0043842 A1 | 2/2008 | Nakaishi | |
| 2008/0084491 A1* | 4/2008 | He | H04N 19/577 348/333.13 |
| 2008/0095240 A1* | 4/2008 | Choi | H04N 19/136 375/E7.076 |
| 2008/0126278 A1* | 5/2008 | Bronstein | H04N 19/61 706/17 |
| 2009/0021612 A1 | 1/2009 | Hamilton, Jr. et al. | |
| 2009/0153699 A1 | 6/2009 | Satoh et al. | |
| 2009/0180539 A1* | 7/2009 | Kudana | H04N 19/523 375/E7.123 |
| 2009/0244288 A1 | 10/2009 | Fujimoto et al. | |
| 2009/0323810 A1 | 12/2009 | Liu et al. | |
| 2010/0002770 A1* | 1/2010 | Motta | H04N 19/147 375/240.16 |
| 2010/0034270 A1 | 2/2010 | Nagaraj et al. | |
| 2010/0086049 A1 | 4/2010 | Ye et al. | |
| 2010/0149393 A1 | 6/2010 | Zarnowski et al. | |
| 2010/0226438 A1* | 9/2010 | Saunders | H04N 19/147 375/240.16 |
| 2010/0265316 A1 | 10/2010 | Sali et al. | |
| 2010/0278269 A1* | 11/2010 | Andersson | H04N 19/61 375/E7.243 |
| 2011/0268194 A1 | 11/2011 | Nagano | |
| 2012/0020413 A1 | 1/2012 | Chen et al. | |
| 2012/0033039 A1 | 2/2012 | Sasaki et al. | |
| 2012/0044990 A1* | 2/2012 | Bivolarsky | H04N 19/105 375/240.03 |
| 2012/0147975 A1 | 6/2012 | Ju | |
| 2012/0281924 A1* | 11/2012 | Coulombe | G06T 7/0002 382/218 |
| 2013/0077690 A1 | 3/2013 | Wei et al. | |
| 2013/0101039 A1* | 4/2013 | Florencio | H04N 19/176 375/240.16 |
| 2013/0163674 A1* | 6/2013 | Zhang | H04N 19/51 375/240.24 |
| 2013/0208795 A1* | 8/2013 | Xu | H04N 19/52 375/240.16 |
| 2013/0265388 A1* | 10/2013 | Zhang | H04N 13/161 348/43 |
| 2013/0301727 A1* | 11/2013 | Huang | H04N 19/503 375/240.16 |
| 2013/0301732 A1* | 11/2013 | Hsu | H04N 19/105 375/240.16 |
| 2013/0322753 A1 | 12/2013 | Lim et al. | |
| 2013/0329006 A1 | 12/2013 | Boles et al. | |
| 2014/0161188 A1* | 6/2014 | Zhang | H04N 19/597 375/240.16 |
| 2014/0177726 A1* | 6/2014 | Okajima | H04N 19/51 375/240.16 |
| 2015/0237356 A1 | 8/2015 | Wu et al. | |
| 2015/0312588 A1 | 10/2015 | Yamamoto et al. | |
| 2016/0100186 A1 | 4/2016 | Gisquet et al. | |
| 2016/0191946 A1* | 6/2016 | Zhou | H04N 19/17 375/240.16 |
| 2016/0286232 A1* | 9/2016 | Li | H04N 19/513 |
| 2016/0345018 A1* | 11/2016 | Sadhwani | H04N 19/517 |
| 2017/0006294 A1 | 1/2017 | Huang et al. | |
| 2017/0134732 A1 | 5/2017 | Chen | |
| 2017/0332291 A1 | 11/2017 | Lee et al. | |
| 2018/0098070 A1* | 4/2018 | Chuang | H04N 19/11 |
| 2018/0124418 A1* | 5/2018 | Van Leuven | H04N 19/159 |
| 2018/0152699 A1 | 5/2018 | Kumar et al. | |
| 2018/0302640 A1* | 10/2018 | Li | H04N 19/105 |
| 2018/0316929 A1* | 11/2018 | Li | H04N 19/105 |
| 2018/0343448 A1* | 11/2018 | Possos | H04N 19/176 |
| 2018/0359483 A1* | 12/2018 | Chen | H04N 19/44 |
| 2018/0376160 A1* | 12/2018 | Zhang | H04N 19/58 |
| 2019/0037227 A1* | 1/2019 | Holland | H04N 19/96 |
| 2019/0058882 A1* | 2/2019 | Hinz | H04N 19/18 |
| 2019/0110058 A1* | 4/2019 | Chien | H04N 19/44 |
| 2019/0141318 A1 | 5/2019 | Li et al. | |
| 2019/0158882 A1* | 5/2019 | Chen | H04N 19/147 |
| 2019/0188829 A1* | 6/2019 | Wei | H04N 19/55 |
| 2019/0200044 A1 | 6/2019 | Galpin et al. | |
| 2019/0230376 A1 | 7/2019 | Hu et al. | |
| 2019/0327484 A1* | 10/2019 | Grange | H04N 19/52 |
| 2020/0077116 A1* | 3/2020 | Lee | H04N 19/122 |
| 2020/0098132 A1 | 3/2020 | Kim | |
| 2020/0245016 A1 | 7/2020 | Levi et al. | |
| 2021/0250605 A1 | 8/2021 | Lee | |

OTHER PUBLICATIONS

U.S. Appl. No. 17/095,765 Office Action dated Sep. 22, 2022.
Main Concept, "MainConcept Accelerates HEVC Encoding with NVIDIA RTX GPUs", Newsletter, pp. 1-4, Apr. 8, 2019 downloaded from https://www.mainconcept.com/company/news/news-article/article/mainconcept-accelerates-hevc-encoding-with-nvidia-rtx-gpus.html.
U.S. Appl. No. 16/442,581 Office Action dated Nov. 30, 2020.
U.S. Appl. No. 17/898,496 Office Action dated Feb. 3, 2023.
U.S. Appl. No. 17/095,765 Office Action dated Dec. 6, 2021.
U.S. Appl. No. 17/095,765 Office Action dated Mar. 17, 2022.
U.S. Appl. No. 17/095,765 Office Action dated Jan. 18, 2023.
De Rivaz et al., "AV1 Bitstream & Decoding Process Specification", pp. 1-681, Jan. 8, 2019.
Grange et al., "A VP9 Bitstream Overview draft-grange-vp9-bitstream-00", Network Working Group, pp. 1-14, Feb. 18, 2013.
ITU-T Recommendation H.264., "Series H: Audiovisual and Multimedia Systems: Infrastructure of audiovisual services—Coding of moving video; Advanced video coding for generic audiovisual services", pp. 1-282, May 2003.
ITU-T Recommendation H.265., "Series H: Audiovisual and Multimedia Systems: Infrastructure of audiovisual services—Coding of moving video; High efficiency video coding", pp. 1-634, Apr. 2015.
Wikipedia., 'Versatile Video Coding', pp. 1-5, Feb. 22, 2019 (https://en.wikipedia.org/w/index.php?title=Versatile_Video_Coding&oldid=884627637).

(56) References Cited

OTHER PUBLICATIONS

U.S. Appl. No. 16/442,581 Office Action dated May 3, 2022.
U.S. Appl. No. 17/095,765 Office Action dated Jun. 9, 2022.
U.S. Appl. No. 16/442,581 Office Action dated Jun. 23, 2021.
U.S. Appl. No. 16/850,036 Office Action dated Sep. 8, 2021.
Sjoberg et al., "RTP Payload Format and File Storage Format for the Adaptive Multi-Rate (AMR) and Adaptive Multi-Rate Wideband (AMR-WB) Audio Codecs," Network Working Group, Request for Comments 4867, pp. 1-59, Apr. 2007.
SMPTE Standard—"Transport of High Bit Rate Media Signals over IP Networks (HBRMT)", The Society of Motion Picture and Television Engineers, pp. 1-16, Oct. 9, 2012.
Gharai et al., "RTP Payload Format for Uncompressed Video", Internet Engineering Task Force, Internet-Draft, pp. 1-14, Nov. 3, 2002.
U.S. Appl. No. 17/493,877 Office Action dated Mar. 11, 2024.

\* cited by examiner

| Block | Ref score (lower is better) | Ref MV, ref frame |
|---|---|---|
| 0 | 5 | 0,0,0 |
| *0* | *6* | *¼,-¼,0* |
| 0 | 7 | 1,2¼,0 |
| 0 | 11 | 1,1,0 |
| 0 | 13 | -2,-¼,1 |
| 1 | 0 | -2,0,0 |
| *1* | *3* | *¼-¼,0* |
| 1 | 8 | 1,1,1 |
| 1 | 29 | 2,1,1 |
| 1 | 31 | 2,2¼,0 |
| 2 | 0 | 1,1,0 |
| *2* | *1* | *¼-¼,0* |
| 2 | 4 | 2,2,1 |
| 2 | 7 | 2,2¼,1 |
| 2 | 35 | 2,0,1 |
| 3 | 0 | 0,0,1 |
| *3* | *1* | *¼,-¼,0* |
| 3 | 2 | 2,2,1 |
| 3 | 29 | 3,0,1 |
| 3 | 29 | 3,¼,1 |

| Block | Ref score (lower is better) | Ref MV, ref frame |
|---|---|---|
| _0_ | _5_ | _0,0,0_ |
| _0_ | _6_ | ¼ , -¼ ,0 |
| _0_ | _7_ | ¼ ,-¼ ,1 |
| _0_ | _11_ | 1,1,0 |
| _0_ | _13_ | -2,-¼ ,1 |
| _1_ | _0_ | _-2,0,0_ |
| _1_ | _3_ | ¼ - ¼ ,0 |
| _1_ | _8_ | ¼ ,-¼ ,1 |
| _1_ | _29_ | 2,1,1 |
| _1_ | _31_ | 2,2 ¼,0 |
| _2_ | _0_ | _1,1,0_ |
| _2_ | _1_ | ¼ - ¼,0 |
| _2_ | _4_ | ¼ ,-¼ ,1 |
| _2_ | _7_ | 2,2 ¼,1 |
| _2_ | _35_ | 2,0,1 |
| _3_ | _0_ | _0,0,1_ |
| _3_ | _1_ | ¼ ,- ¼,0 |
| _3_ | _2_ | ¼ ,-¼ ,1 |
| _3_ | _29_ | 3,0,1 |
| _3_ | _29_ | 3, ¼ ,1 |

FIG. 11

| | 4K | 1080P | 540P |
|---|---|---|---|
| AVC | 1 | 1 | 1 |
| HEVC | 4.28 | 4.73 | 5.28 |
| AV1 | 590.74 | 546.19 | 806.15 |

COMPUTATIONAL COMPLEXITY

FIG. 16

APPLICATION ACCELERATOR

PRIORITY CLAIM

The present application claims priority to U.S. Provisional Patent Application 62/695,063 of Levi et al, filed 8 Jul. 2018; and to US Provisional Patent Application 62/726,446 of Levi et al, filed 4 Sep. 2018.

FIELD OF THE INVENTION

The present invention relates generally to the fields of computer architecture and application acceleration.

BACKGROUND

Video encoding is described herein as one example of a workload which creates heavy stresses (by way of non-limiting example, in the cloud and/or in the data center; the same applies in other equipment and/or locations that are part of the video flow). With respect to the particular non-limiting example of preparing video for an edge computing device (by way of non-limiting example, for a smart phone, a TV set etc.), data center workload includes millions of video streams which have to be encoded and re-encoded during every minute, in order to stream the streams to multiple devices (generally having different video codecs) in a very efficient way. Persons skilled in the art will appreciate that adaptive streaming additionally requires the video to be encoded to multiple bitrates.

SUMMARY OF THE INVENTION

Persons skilled in the art will appreciate the following:
1. Providing solutions to issues mentioned in the present application (including in the Background thereof) in exemplary embodiments of the present invention have applicability to various use cases, and not only to data center and/or cloud use cases.
2. Solutions provided in exemplary embodiments of the present invention have applicability to (by way of non-limiting example): video compression; motion estimation; video deblocking filter; Current Picture Referencing (CPR) and video transform. Non-limiting examples of relevant systems to which exemplary embodiments of the present invention may be applicable include, by way of non-limiting example: HEVC/H.265 (high efficiency video coding); AVC/H.264 (advanced video coding); VP9; AV-1 (AOMedia Video 1); and VVC (versatile video coding). While, generally, uses of exemplary embodiments of the present invention are described in the context of motion estimation, such descriptions are not meant to be limiting, and persons skilled in the art will appreciate, in light of the description herein, how to provide solutions in at least the other cases mentioned above in the present paragraph.

The load of a single encoding task itself is generally too big for a single CPU. Reference is now made to FIG. 9, which is a simplified graphical illustration depicting a relationship between CPU power and various encoding tasks; to FIG. 10, which is a simplified pictorial illustration depicting an approximate timeline view of various past, present, and future encoding standards; and to FIG. 11, which is a simplified tabular illustration depicting complexity of various encoding standards. FIG. 9 shows that, for quite some time, a single CPU has not been able to keep up with a single encoding task; this problem, it is believed, will become more severe in the future, as future standards are adopted and become more widely used (see FIG. 10) and as the complexity of those future standards is expected to be higher, as shown in FIG. 11.

In addition, the amount of information/data in every stream is increasing, as more and more information/data is produced and streamed into the edge devices at higher resolution. Reference is now additionally made to FIG. 12, which is a simplified partly pictorial, partly graphical illustration depicting relationships between resolution and complexity. FIG. 12 show a very conservative forecast of resolution mixture along the years, and also shows the nominal complexity involved with the fact that there are more pixels in every stream.

Reference is now additionally made to FIG. 13, which is a simplified graphical illustration depicting relationships between video complexity, CPU capability, and computational effort. FIG. 13 shows that the real video complexity (complexity per pixel×number of pixels) is suffering from a growing gap between CPU capability and the computational effort needed.

The consideration of the problem presented up to this point does not include the major increase, which is expected to continue, in the number of video streams needs to be simultaneously processed in the data center.

Having considered the above, it is fair to ask why the art, as known to the inventors of the present invention, does not yet include any acceleration device offering video encoding acceleration for the data center. Without limiting the generality of the present invention, the term "device" may be used in the present description to describe implementations of exemplary embodiments of the present invention, as well as (in the preceding sentence) apparent lacks in the known art. It is appreciated that, in exemplary embodiments of the present invention, by way of non-limiting example, implementation may take place in: an ASIC [Application Specific Integrated Circuit]; an ASSP [Application Specific Standard Part]; an SOC [System on a Chip], an FPGA [Field Programable Gate Array]; in a GPU [graphics processing unit]; in firmware; or in any appropriate combination of the preceding.

The inventors of the present invention believe that the reasons that the art, as known to the inventors of the present invention, does not yet include an appropriate video acceleration as described above include:
1. Technological reason
   The huge diversity in the video standards (as partially imposed by the situation depicted in FIG. 10) which need to be supported, as well as the rich feature-set needed in order to fully support any single encoder, might make it appear, prior to the invention of exemplary embodiments of the present invention, to be impossible to create a generic acceleration device for accelerating video encoding in the data center.
2. Business reason
   In the last decade, a huge amount of technology and knowledge was gained in the industry by encoder vendors (who generally, but not necessarily, provide their encoders in software [SW]; for purposes of ease of description, the term "SW" is used throughout the present specification and claims to describe such encoders, which might in fact be provided, generally by encoder vendors in software, firmware, hardware, or any appropriate combination thereof) that tuned the video encoding to "their best sweet spot", representing what each encoder vendor believed to be their competitive advantage. It is important in this context to understand that video compression, by its nature as a lossy compression, differs in various implementations in many aspects, such as: performance; CPU load; latency; (which are also well known in other, non-video workloads); but also in quality. For the aspect of quality, there is no common and accepted objective metric that quantifies and grades the quality; rather, multiple metrics (such as, for example, PSNR, SSIM, and VMAF) are known, with no universal agreement on which metric is appropriate. Thus, the accumulated knowledge and reputation of each company somehow blocks any potential acceleration device vendor that wishes to penetrate the market of acceleration devices. In other words, if such a vendor were to create a device such as, by way of on particular non-limiting example, an ASIC implementing a video codec, the vendor would find himself competing against the entire ecosystem. Even within a given vendor, different quality measures might be used for different use cases, thus leading to an incentive to produce multiple such ASIC implementations.

The present invention, in exemplary embodiments thereof, seeks to provide an improved video encoding, video compression, motion estimation, Current Picture Referencing (CPR), and computer architecture system in which part of the work (such as, by way of non-limiting example, any one or more of the following: motion estimation; Current Picture Referencing (CPR) transform; deblocking; loop filter; and context-adaptive binary arithmetic coding (CABAC) engine) is offloaded in such a way that (in the specific non-limiting example of an encoder):

1. Work will be dramatically offloaded from the encoder;
2. The exemplary embodiments of the present invention will be agnostic to the specific encoder being implemented; and
3. A given encoder vendor (by way of non-limiting example, a software encoder vendor) will be enabled to run their own "secret sauce" and use one or more exemplary embodiments of the present invention to provide acceleration as a primitive operation. The appropriate quality/performance can be chosen by a given encoder vendor for the appropriate use case/s.

There is thus provided in accordance with an exemplary embodiment of the present invention a system including an acceleration device including input circuitry configured, for each of a first plurality of video frames to be encoded, to receive an input including at least one raw video frame and at least one reference frame, and to divide each of the first plurality of video frames to be encoded into a second plurality of blocks, and similarity computation circuitry configured, for each one of the first plurality of video frame to be encoded: for each the block of the second plurality of blocks, to produce a score of result blocks based on similarity of each the block in each frame to be encoded to every block of the reference frame, and a displacement vector.

Further in accordance with an exemplary embodiment of the present invention the at least one raw video frame and the at least one reference frame are identical.

Still further in accordance with an exemplary embodiment of the present invention the score of result blocks includes a ranked list.

Additionally in accordance with an exemplary embodiment of the present invention the result blocks are of fixed size.

Moreover in accordance with an exemplary embodiment of the present invention the result blocks are of variable size.

Further in accordance with an exemplary embodiment of the present invention the system also includes weighting circuitry configured to weight at least some of the second plurality of blocks.

Still further in accordance with an exemplary embodiment of the present invention, for a given block B of the second plurality of blocks, the weighting circuitry is configured to weight the block B to produce a weighted block B' in accordance with the following formula B'=A*B+C1, where A and C1 are scalars.

Additionally in accordance with an exemplary embodiment of the present invention the system also includes upsampling circuitry configured to upsample at least some of the second plurality of blocks, and wherein the score of results blocks is based on similarity of each the block to at least one upsampled block.

Moreover in accordance with an exemplary embodiment of the present invention the system also comprises a second component, and the second component receives an output from the acceleration device and produces, based at least in part on the output received from the acceleration device, a second component output in accordance with a coding standard.

Further in accordance with an exemplary embodiment of the present invention the second component includes a plurality of second components, each of the plurality of second components producing a second component output in accordance with a coding standard, the coding standard for one of the plurality of second components being different from a coding standard of others of the plurality of second components.

Still further in accordance with an exemplary embodiment of the present invention the coding standard for at least one of the plurality of second components includes at least one of the following HEVC/H.265, AVC/H.264, VP9, AV-1, and VVC.

Additionally in accordance with an exemplary embodiment of the present invention the second component includes an aggregation component configured to aggregate a plurality of adjacent blocks having equal displacement vectors into a larger block.

Moreover in accordance with an exemplary embodiment of the present invention the larger block has a displacement vector equal to a displacement vector of each of the plurality of blocks having equal displacement vectors, and the larger block has a score equal to a sum of scores of the plurality of blocks having equal displacement vectors.

There is also provided in accordance with another exemplary embodiment of the present invention a method including providing an acceleration device including input circuitry configured, for each of a first plurality of video frames to be encoded, to receive an input including at least one raw video frame and at least one reference frame, and to divide each of the first plurality of video frames to be encoded into a second plurality of blocks, and similarity computation circuitry configured, for each one of the first plurality of video frame to be encoded: for each the block of the second plurality of blocks, to produce: a score of result blocks based on similarity of each the block in each frame to be encoded to every block of the reference frame; and a displacement vector, and providing the input to the acceleration device, and producing the score of result blocks and the displacement vector based on the input.

Further in accordance with an exemplary embodiment of the present invention the at least one raw video frame and the at least one reference frame are identical.

Still further in accordance with an exemplary embodiment of the present invention the score of result blocks includes a ranked list.

Additionally in accordance with an exemplary embodiment of the present invention the result blocks are of fixed size.

Moreover in accordance with an exemplary embodiment of the present invention the result blocks are of variable size.

Further in accordance with an exemplary embodiment of the present invention the method also includes weighting at least some of the second plurality of blocks.

Still further in accordance with an exemplary embodiment of the present invention, for a given block B of the second plurality of blocks, the weighting weights the block B to produce a weighted block B' in accordance with the following formula B'=A*B+C1 where A and C1 are scalars.

Additionally in accordance with an exemplary embodiment of the present invention the method also includes upsampling at least some of the second plurality of blocks, and wherein the score of results blocks is based on similarity of each the block to at least one upsampled block.

Moreover in accordance with an exemplary embodiment of the present invention the method also includes providing a second component receiving an output from the acceleration device and producing, based at least in part on the output received from the acceleration device, a second component output in accordance with a coding standard.

Further in accordance with an exemplary embodiment of the present invention the second component includes a plurality of second components, each of the plurality of second components producing a second component output in accordance with a coding standard, the coding standard for one of the plurality of second components being different from a coding standard of others of the plurality of second components.

Additionally in accordance with an exemplary embodiment of the present invention the coding standard for at least one of the plurality of second components includes at least one of the following HEVC/H.265, AVC/H.264, VP9, AV-1, and VVC.

Moreover in accordance with an exemplary embodiment of the present invention the second component includes an aggregation component configured to aggregate a plurality of adjacent blocks having equal motion vectors into a larger block.

Further in accordance with an exemplary embodiment of the present invention the larger block has a displacement vector equal to a displacement vector of each of the plurality of blocks having equal rank, and the larger block has a score equal to a sum of scores of the plurality of blocks having equal displacement vectors.

BRIEF DESCRIPTION OF THE DRAWINGS

The present invention will be understood and appreciated more fully from the following detailed description, taken in conjunction with the drawings in which:

FIG. 6 is another simplified tabular illustration depicting an exemplary result of operations performed by an acceleration device in accordance with an exemplary embodiment of the present invention;

FIG. 11 is a simplified tabular illustration depicting complexity of various encoding standards;

FIG. 16 is a simplified pictorial illustration depicting a non-limiting example of pixel sub blocks;

DETAILED DESCRIPTION OF AN EMBODIMENT

The following general discussion may be helpful in understanding certain exemplary embodiments of the present invention which are described herein.

Among hundreds of tools in a video compression standard, the motion estimation portion/tool, (which is described in the standard by the motion compensation procedure), is generally considered to be the most demanding one when it comes to computational effort. The preceding also applies a Current Picture Referencing (CPR) tool.

Figure 14:
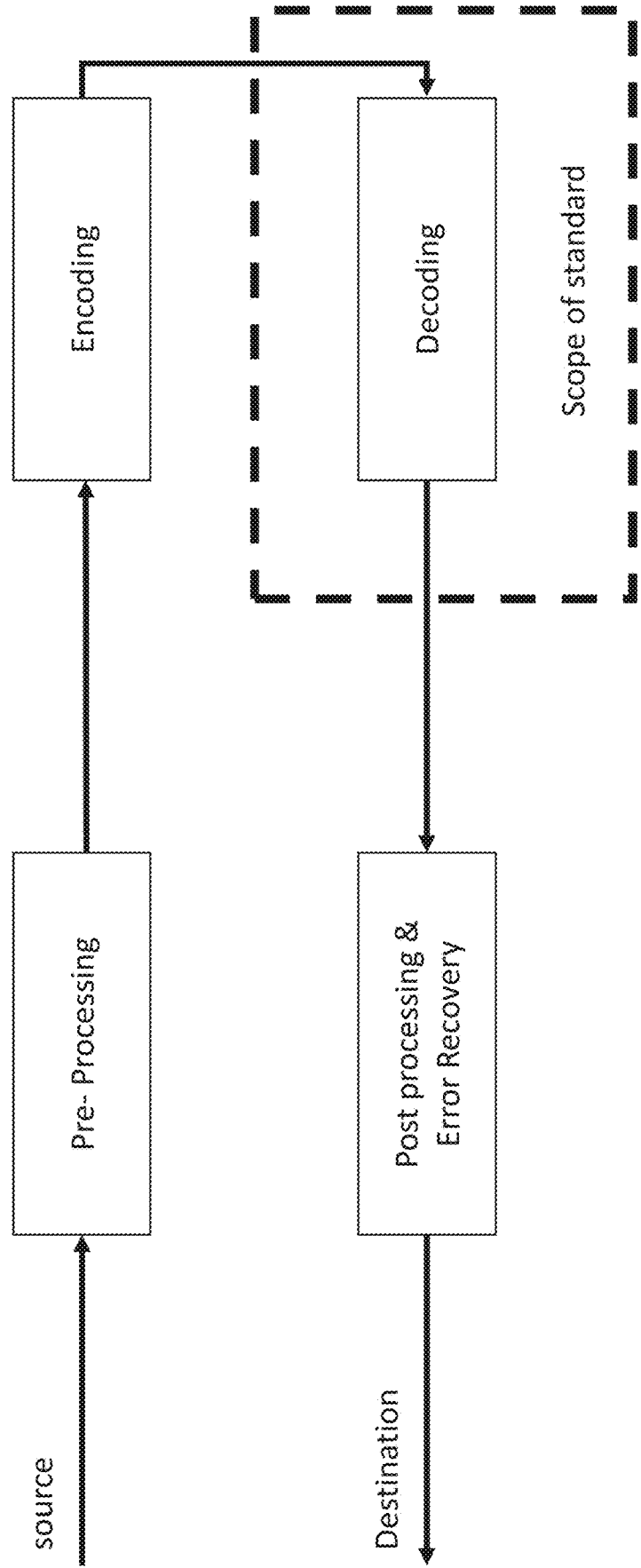
FIG. 14 is a simplified pictorial illustration depicting various portions of video codec standards.

Theoretically, motion estimation is not part of the video standard, as illustrated in FIG. 14, which is a simplified pictorial illustration depicting various portions of video codec standards. However, a motion estimation procedure is involved in comparing a block (termed herein a "reference block") against many blocks in the reference frames, finding the block with greatest (or in some cases close to greatest) similarity, and then performing a motion compensation which comprises, as is well known, writing the residual (as is known in the art) as well as the motion vectors (also termed herein "displacement vectors") in the bitstream. In some cases, a "factor" may be used to find a block which, multiplied by some constant (factor), is close to a given block. In other cases, two blocks from two different frames may be combined via weighted summing, and then a block close to the average may be found.

Typically, in many codec systems, the motion estimation and the motion compensation are built as one unit, which means that the motion estimation score function (which is the "similarity" to the reference block), is the same as the compensation part, thus allowing the codec to use the score of the best matching block as a residual in the bitstream without further processing.

Figure 1A:
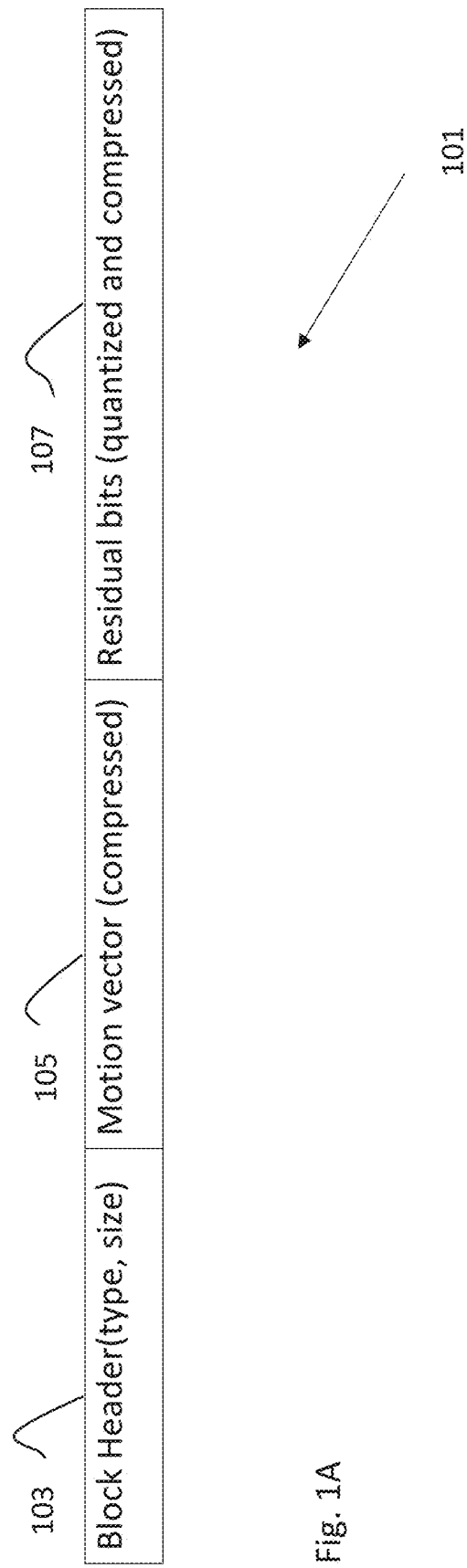
FIG. 1A is a simplified tabular illustration depicting an inter block in a video bit stream.

Reference is now made to FIG. 1A, which is a simplified tabular illustration depicting an inter block, generally designated 101, in a video bit stream. A high level view of a inter block in a video bitstream is shown in FIG. 1A.

A block header 103 specifies the block type (which can in general be, by way of non-limiting example, inter or intra, the particular non-limiting example shown in FIG. 1A being an inter block with a single motion vector (MV) structure).

A motion vector 105 represents the distance between the top left corner of the inter block to the top left corner of the reference block, while residual bits 107, in certain exemplary embodiments, represent the difference between the reference block and the target block (a given block). Each one of the sections shown in FIG. 1A may be compressed differently, as is known in the art.

The portion/size of each section in FIG. 1A is dynamic, in that each one of the three sections can be of variable size. A goal, in exemplary embodiments of the present invention, is to reduce the total number of bits in an entire bitstream, not just to reduce the total number of bits in a given inter block.

Generally speaking, the part of the process of generating an inter block which involves heavy computation is to read (in many case, by way of non-limiting example) tens of blocks for every reference block and to calculate the respective differences. Performing this operation itself may consume approximately 50 times more memory bandwidth than accessing the raw video itself. It is also appreciated that the compute effort of the process of generating an inter block may be very large, approximately, as well as the compute effort which is estimated to be approximately 50 O(number of pixels).

The motion estimation part is generally responsible not only for finding a block with the minimal residual relative to each reference, but also for finding an optimal partitioning; by way of non-limiting example, a 32×32 block with 5 bits residual will consume many fewer bits in the bitstream than 4 8×8 blocks with 0 bits residual in each of them. In this particular non limiting example, the 32×32 block partitioning would be considered optimal. Persons skilled in the art will appreciate that the method of selecting the best matched block is dependent on the details of the particular codec standard, including, by way of non-limiting example, because different standards treat motion vectors having large magnitude differently. Non-limiting examples of "differently" in the preceding sentence include: different partitioning; different sub-pixel interpolation; and different compensation options which may be available. It is appreciated that, in exemplary embodiments of the present invention, sub-pixels are produced by upsampling, as is known in the art.

Figure 2:
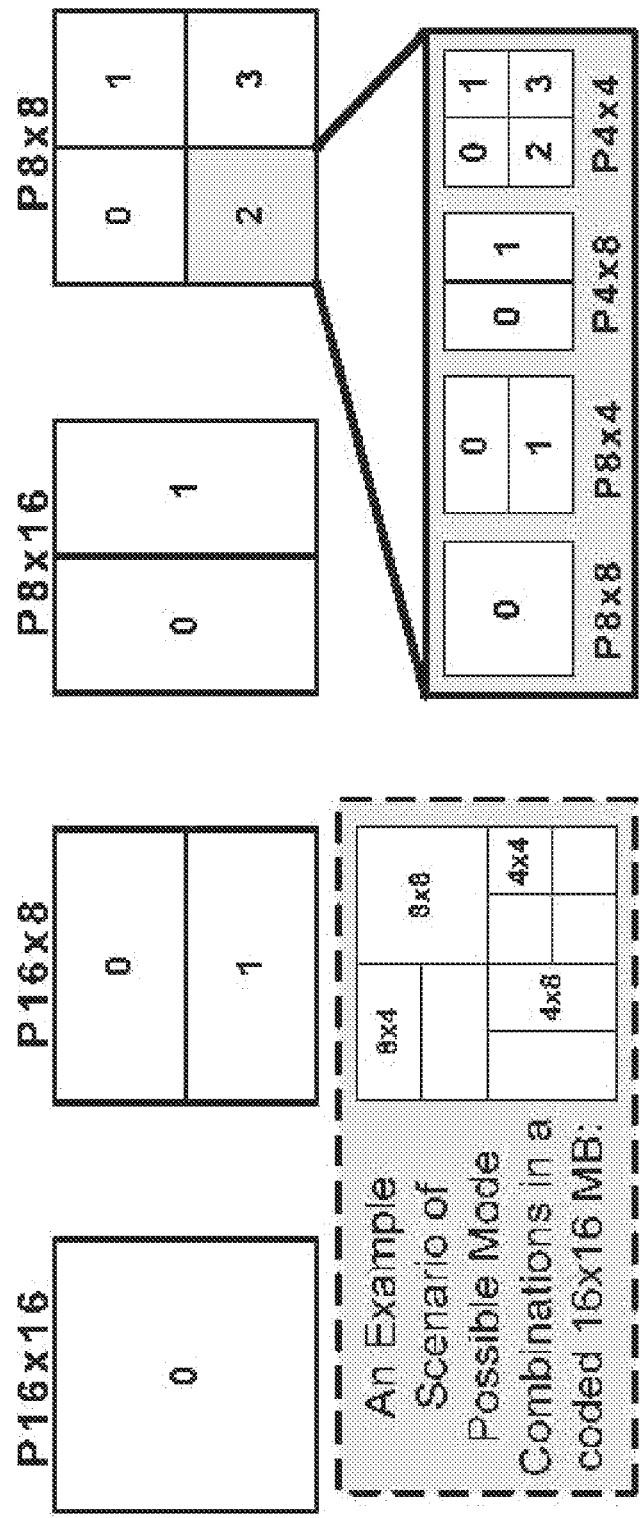
FIG. 2 is a simplified pictorial illustration depicting H.264/AVC block partitioning.
Figure 3:
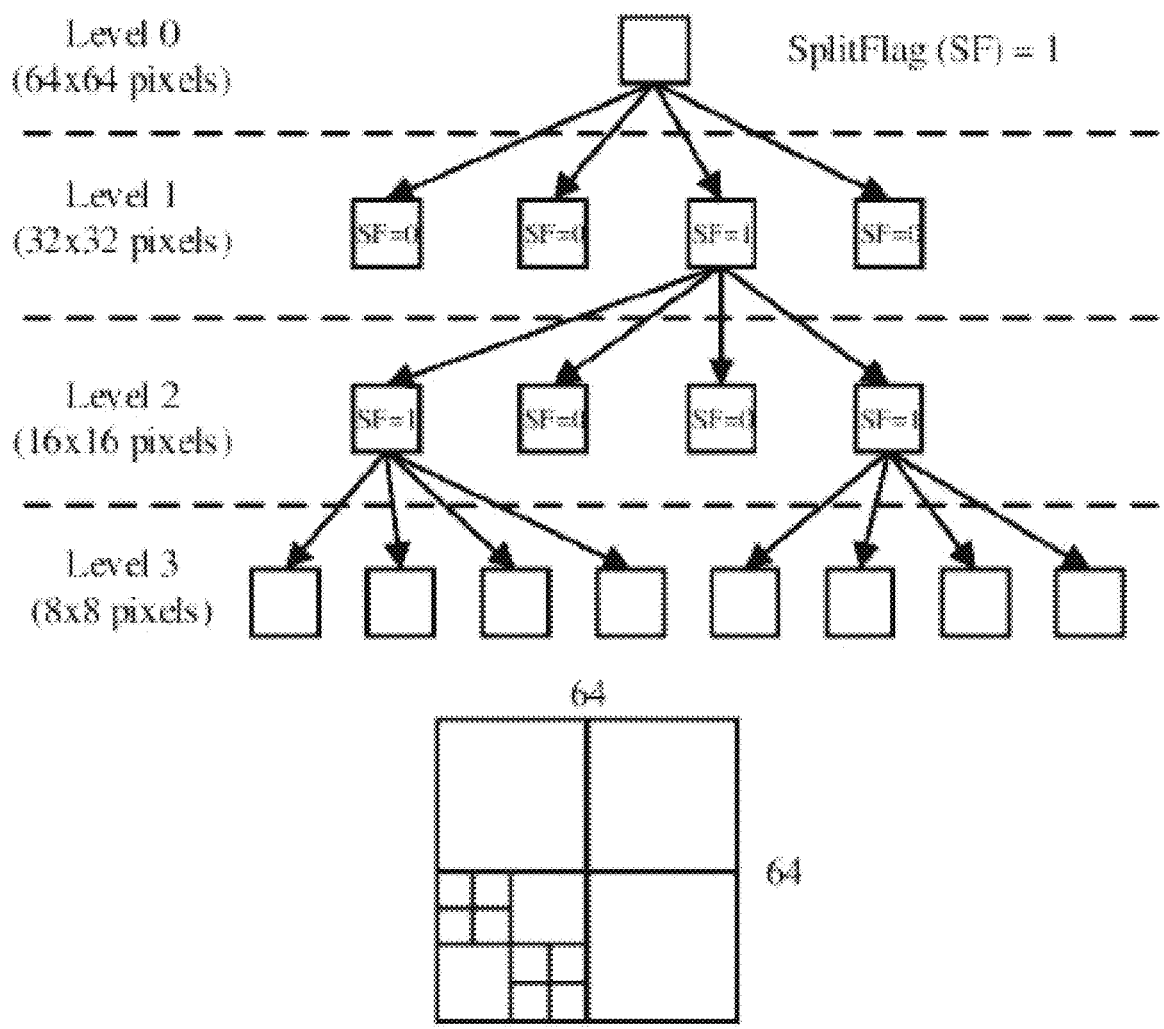
FIG. 3 is a simplified pictorial illustration depicting HEVC (H.265) block partitioning.

In addition to what has been stated above, the different video standards differ from one another, with respect to motion compensation, in at least the following parameters:

1. Motion vector resolution:
   Older standards allow only full pixel comparison (against real blocks), while newer standards allow fractional sampling interpolations. The different standards also differ in filters used for the interpolation/s. Other features which differ between different standards include the particulars of rounding and clipping, as are well known in the art.
2. Motion compensation residual function: calculates residual data in the bitstream.
3. Block size being compensated. By way of particular non-limiting example:
   In H.264/AVC block partitioning as shown in FIG. 2 was allowed by the standard.
   By contrast, in H.265/HEVC, the partitioning shown in FIG. 3 was introduced.
4. Weighted prediction. Weighted prediction was introduced in H.264 standard, in the Main and Extended profiles. The weighted prediction tool allows scaling of a reference frame with a multiplicative weighting factor, and also add an additive offset (constant) to each pixel. The weighted prediction tool is generally considered to be highly powerful in scenes of fade in/fade out. When fades are uniformly applied across the entire picture, a single weighting factor and offset are sufficient to efficiently encode all macroblocks in a picture that are predicted from the same reference picture. When multiple reference pictures are used, the best weighting factor and offsets generally differ during a fade for the different reference pictures, as brightness levels are more different for more temporally distant pictures.

By way of particular non-limiting example: for single directional prediction the following equation represents the motion compensation with weighted prediction:

$$SampleP = Clip1(((SampleP \cdot W0 + 2LWD - 1) >> LWD) + O0)$$

where Clip1( ) is an operator that clips to the range [0, 255], W0 and O0 are the reference picture weighting factor and offset respectively, and LWD is the log weight denominator rounding factor. SampleP is the list 0 initial predictor, and SampleP is the weighted predictor.

Persons skilled in the art will appreciate that the motion estimation is generally performed against the weighted reference frame (resulting from applying the above SampleP formula). Persons skilled in the art will further appreciate that it is a reasonable assumption that the compensation function will be different in future codecs.

It appears reasonable to assume that future codec standards will continue to differ in the points mentioned immediately above.

Motion estimation procedures include "secret sauce" as described above. In order to allow agnostic preparation which will later allow motion estimation with the desired "secret sauce", exemplary embodiments of the present invention will make many more calculations than are known in systems which do not use an acceleration device in accordance with exemplary embodiments of the present invention, leaving open later decisions to be made by the motion compensation/estimation software.

The following is a description of an exemplary embodiment of a method useable in order to create a generic and agnostic acceleration device, offloading motion estimation and Current Picture Referencing (CPR) for a particular codec. By way of non-limiting example, implementation of an appropriate acceleration device may take place in: an ASIC [Application Specific Integrated Circuit]; an ASSP [Application Specific Standard Part]; an SOC [System on a Chip], an FPGA [Field Programable Gate Array]; in firmware; in a GPU [graphics processing unit]; or in any appropriate combination of the preceding. Implementations described in the preceding sentence may also be referred to herein as "circuitry", without limiting the generality of the foregoing. The description will be followed by a detailed explanation of how the acceleration device overcomes issues related to each of Motion vector resolution; Motion compensation residual function; Block size being compensated; and Weighted prediction, as mentioned above. As mentioned above, motion estimation is described as one particular non-limiting example.

Figure 1B:
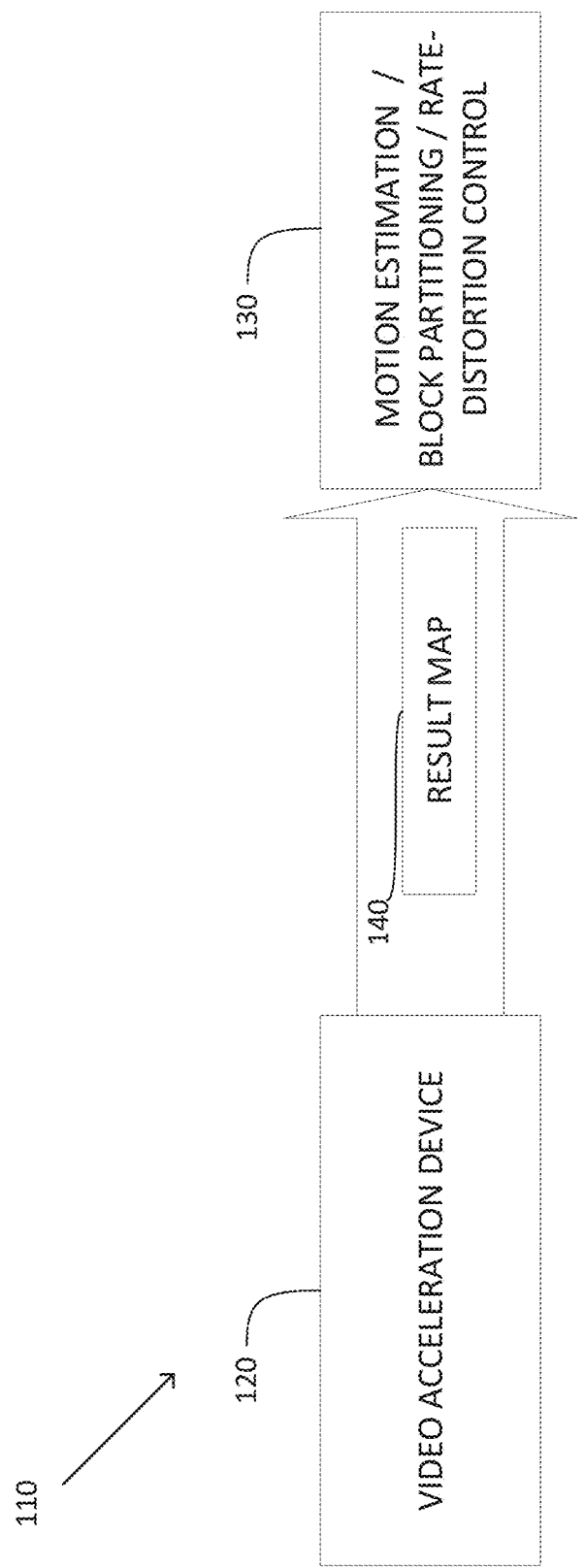
FIG. 1B is a simplified block diagram illustration of an application acceleration system, constructed and operative in accordance with an exemplary embodiment of the present invention.

Reference is now made to FIG. 1B, which is a simplified block diagram illustration of an application acceleration system, constructed and operative in accordance with an exemplary embodiment of the present invention.

In the particular non-limiting example of FIG. 1B, the application acceleration system, generally designated 110, comprises a video acceleration system.

The video acceleration system 110 comprises a video acceleration device 120; exemplary embodiments of the construction and operation of the video acceleration device 120 are further described herein. As described in further detail below, the video acceleration device 120 is, in exemplary embodiments, configured to produce a result map 140.

The result map 140 is provided as input to a further component (often termed herein "SW", as described above); the further component, in exemplary embodiments, comprises a motion estimation/block partitioning/rate-distortion control unit 130. The control until 130 may be, as implied by its full name, responsible for:
motion estimation;
block partitioning; and
rate distortion (determining tradeoffs between bit rate and distortion, for example)

In certain exemplary embodiments of the present invention, it is appreciated that optimal performance may take place when: high memory bandwidth is available; multiple queues are available for managing memory access; and virtual memory address translation is available at high performance and to multiple queues. One non-limiting example of a commercially available system which fulfills the previously-mentioned criteria for optimal performance is the ConnectX-5, commercially available from Mellanox Technologies Ltd. It is appreciated that the example of ConnextX-5 is provided as on particular example, and is not meant to be limiting; other systems may alternatively be used.

The operation of the system of FIG. 1B, and particularly of the video acceleration device 120 of FIG. 1B, is now described in more detail.

Figure 15:
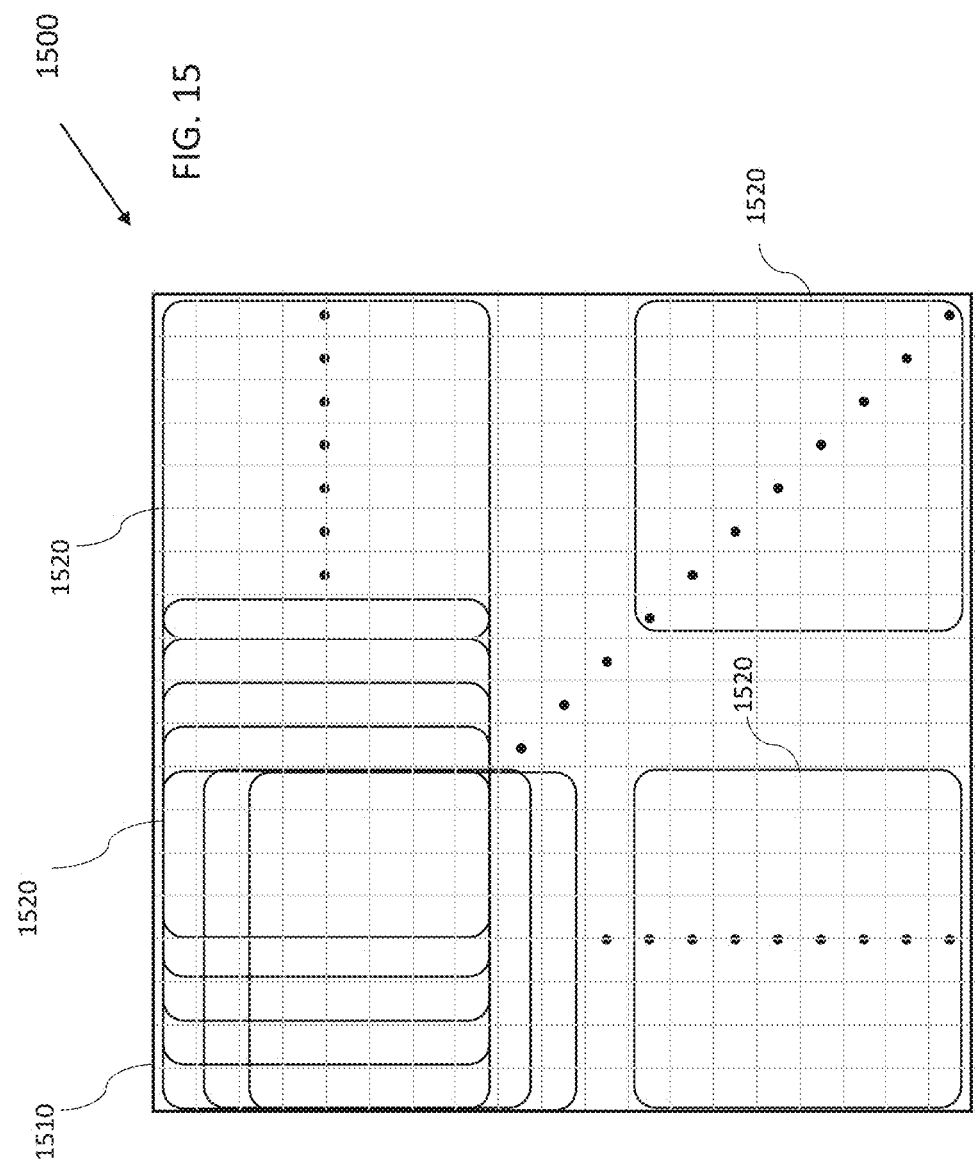
FIG. 15 is a simplified pictorial illustration depicting an exemplary search area for motion vector prediction.

Input to the System:

In certain exemplary embodiments of the present invention, for each video frame being encoded (termed herein "target frame"), the video acceleration device 120 reads previously decoded frames (also known as reconstructed raw video), against which the target frame is being compensated; by way of particular non-limiting example, two previously decoded frames may be read. It is appreciated that, in an exemplary embodiment using CPR, the video acceleration device 120 may read/use the target frame twice, once as a target frame and once as a reference frame. In addition and optionally, a map of motion vector prediction may be provided; the map of motion vector prediction shows a center of a search area for each block. The particular example in the previous sentence is non-limiting, it being appreciated that a center of search are may be determined, including independently, for any given block. Reference is now additionally made to FIG. 15, which is a simplified pictorial illustration depicting an exemplary search area for motion vector prediction. In FIG. 15, an exemplary map (generally designated 1500) is shown. In the particular non-limiting example of FIG. 15, the center of the search area for a given block is designated 1510. In the particular non-limiting example of FIG. 15, the search area comprises a plurality of search blocks 1520, only some of which have been labeled with reference number 1520 for ease of depiction. It is appreciated that, optionally, other parameters may be configured and may help the system "tune" to a specific encoder, specifying desired quality and speed; such parameters may include, by way of non-limiting example: accuracy of sub pixel interpolation; search area size; aggregation level (maximum block size being aggregated); partitioning information (whether partitioning may be, for example, only into squares or also into rectangles); and block matching function to be used (such as, by way of non-limiting example: SAD (Sum of Absolute Difference); and SSE (Sum of Square Error)).

Figure 4:
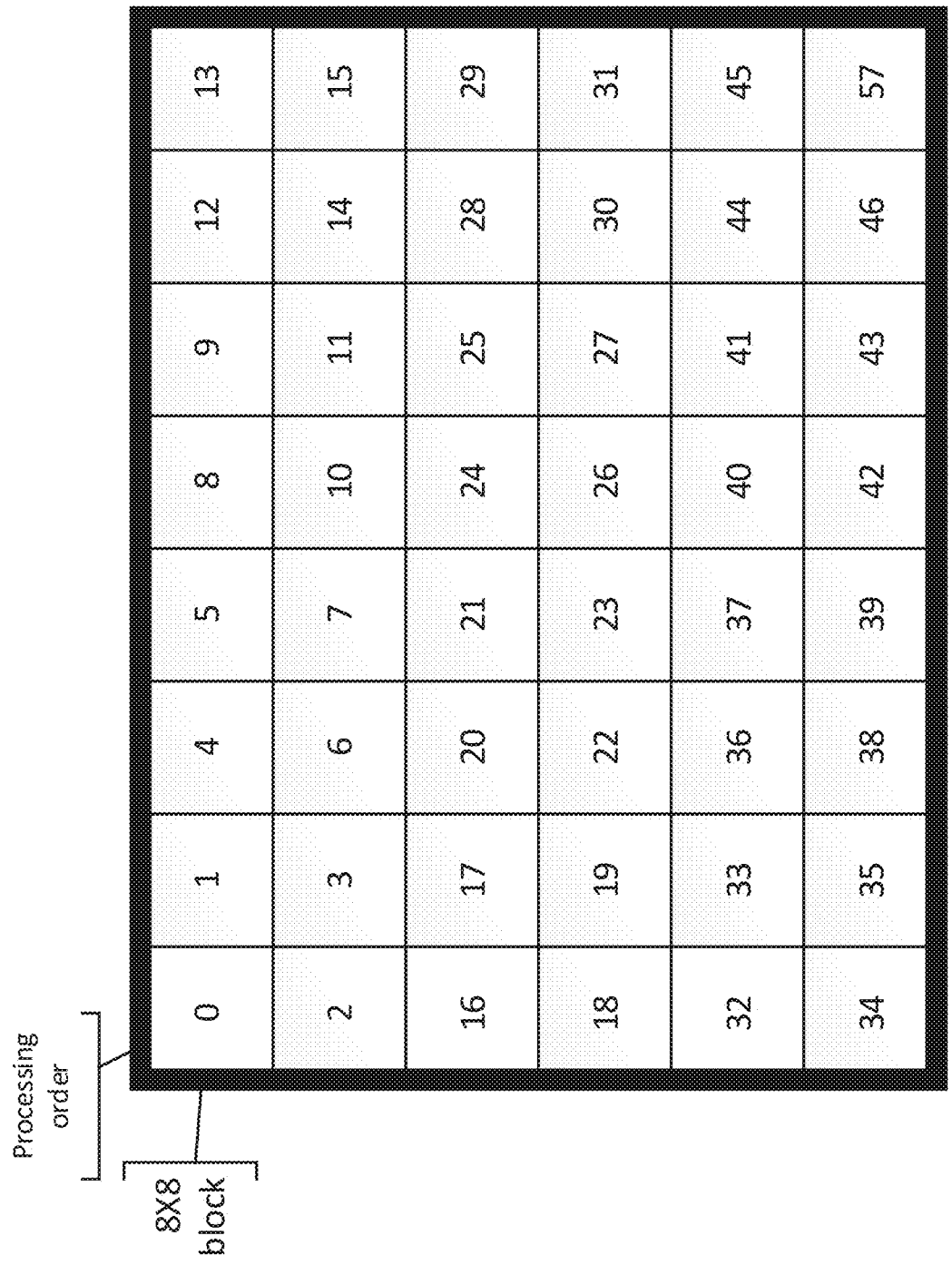
FIG. 4 is a simplified tabular illustration depicting an exemplary order of block encoding, intended in exemplary cases to be performed by an application acceleration system such as the system of FIG. 1B.

Output of the System:

Reference is now additionally made to FIG. 4, which is a simplified tabular illustration depicting an exemplary order of block encoding, intended in exemplary cases to be performed by an application acceleration system such as the application acceleration system 110 of FIG. 1B. In certain exemplary embodiments of the present invention, the video acceleration device 120 outputs a list of the top ranked blocks, which have maximal similarity to each and every one of the blocks being encoded; for example, the current encoded frame is divided into small blocks (such as, by way of non-limiting example, 8×8 blocks). This is illustrated, including an exemplary non-limiting example of an order of block encoding, in FIG. 4.

Figure 5:
FIG. 5 is a simplified tabular illustration depicting an exemplary result of operations performed by an acceleration device in accordance with an exemplary embodiment of the present invention.

Reference is now additionally made to FIG. 5, which is a simplified tabular illustration depicting an exemplary result of operations performed by an acceleration device, such as the video acceleration device 120 of FIG. 1B, in accordance with an exemplary embodiment of the present invention. A result map 500 (which may also be termed an "acceleration vector"), shown in FIG. 5, is an example of the output (also termed herein a "result score board") produced in exemplary embodiments of the present invention; the result map in FIG. 5 is a particular non-limiting example of the result map 140 of FIG. 1B.

The result map of FIG. 5 demonstrate the flexibility which is provided to the SW when using embodiments of the acceleration device described herein, in that (by way of non-limiting example) block partitioning decisions can be carried out based on the data comprised in the result map 500 of FIG. 5. Thus, by way of one non-limiting example, if the SW is "naïve", and uses the first score for every block, it will produce four 8×8 blocks, with a total residual of (5+0+0+0)=5 (see entries marked in bold underscore in the result map 500).

Alternatively, in another non-limiting example, the SW may choose to create one single 32×32 block (since there are 4 scores that has the same MV value, so that the corresponding blocks can be combined) with a residual of:
j (6+3+1+1)=11 (see entries marked in bold italics in the result map 500).

Similarly, the SW can choose to re-partition to bigger blocks, for example when (by way of non-limiting example) based on the results of blocks: 4, 5, 6, 7, 16, 17, 18, 19, 20, 21, 22, 23 which have arrived from the video acceleration device 120 of FIG. 1, in order to partition to 64×64 sizes.

Figure 17A:
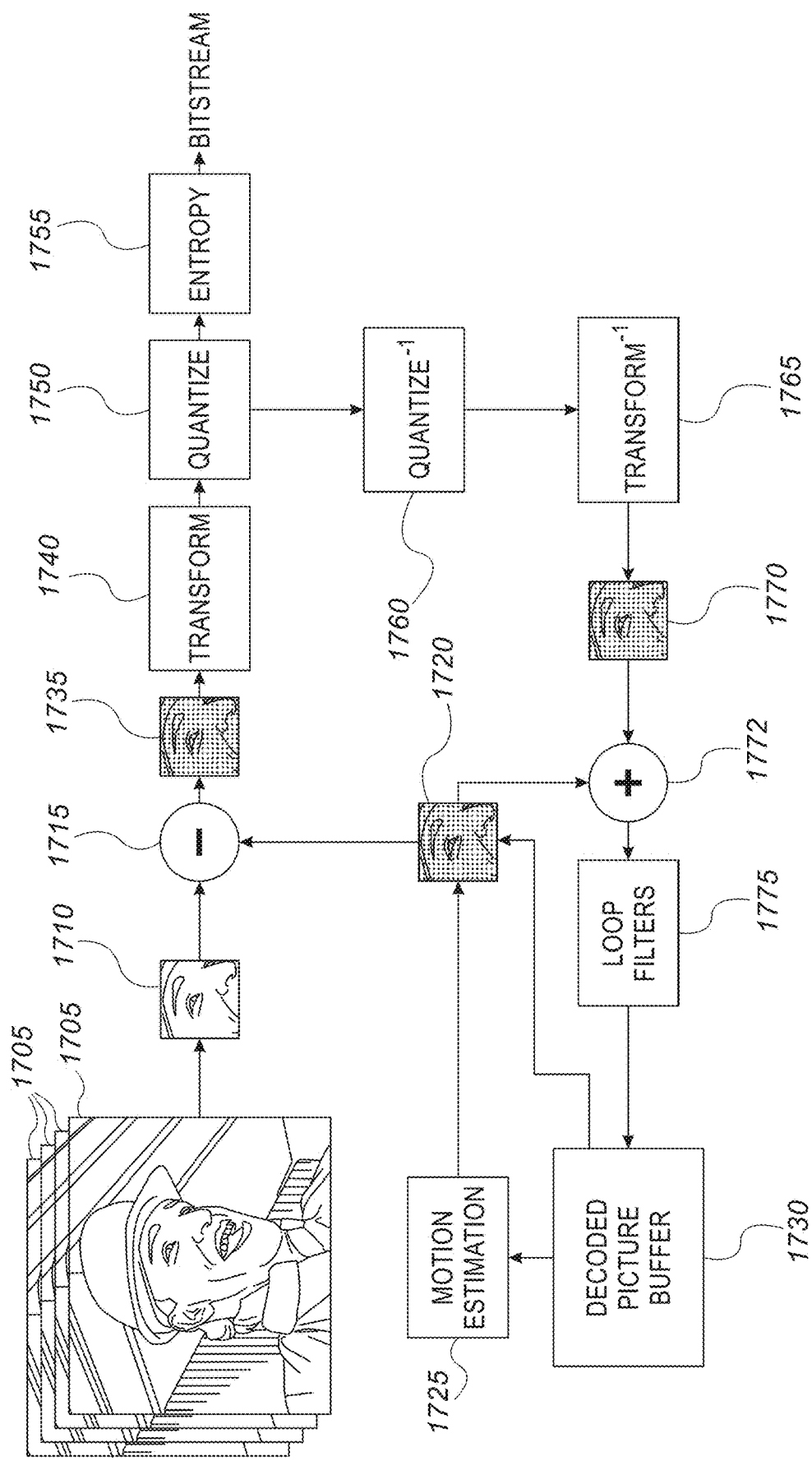
FIG. 17A is a simplified partly pictorial, partly block-diagram illustration depicting an exemplary system and process, including motion estimation, for producing a bitstream.

Reference is now made to FIG. 17A, which is a simplified partly pictorial, partly block-diagram illustration depicting an exemplary system and process, including motion estimation, for producing a bitstream, as is known in the field of video. In the system of FIG. 17A, a plurality of target frames 1705 are input. For a given block 1710 (of one or more target frames 1705, it being appreciated that in general the process is carried out on a plurality of target frames), a comparison operation is carried out at comparison element 1715. The comparison operation is carried out relative to a reference block 1720, produced/chosen by a motion estimation unit 1725, based on a decoded picture input received from a decoded picture buffer 1730.

The result of the comparison element 1715 is a residual block 1735. The residual block 1735 undergoes a transform operation at a transform unit 1740; quantization at a quantizing unit 1750; and entropy encoding in an entropy unit 1755. The output the system of FIG. 17A is a bitstream.

Meanwhile, quantized data from the quantizing unit 1750 is dequantized an inverse quantizing unit 1760, and undergoes an inverse transform operation at an inverse transform unit 1765, thus producing a decoded residual block 1770. The decoded residual block 1770 is added to the reference block 1720 at element 1772, with a result thereof being processed by loop filters 1775, and then sent to the decoded picture buffer 1730, for further processing as previously described.

Figure 17B:
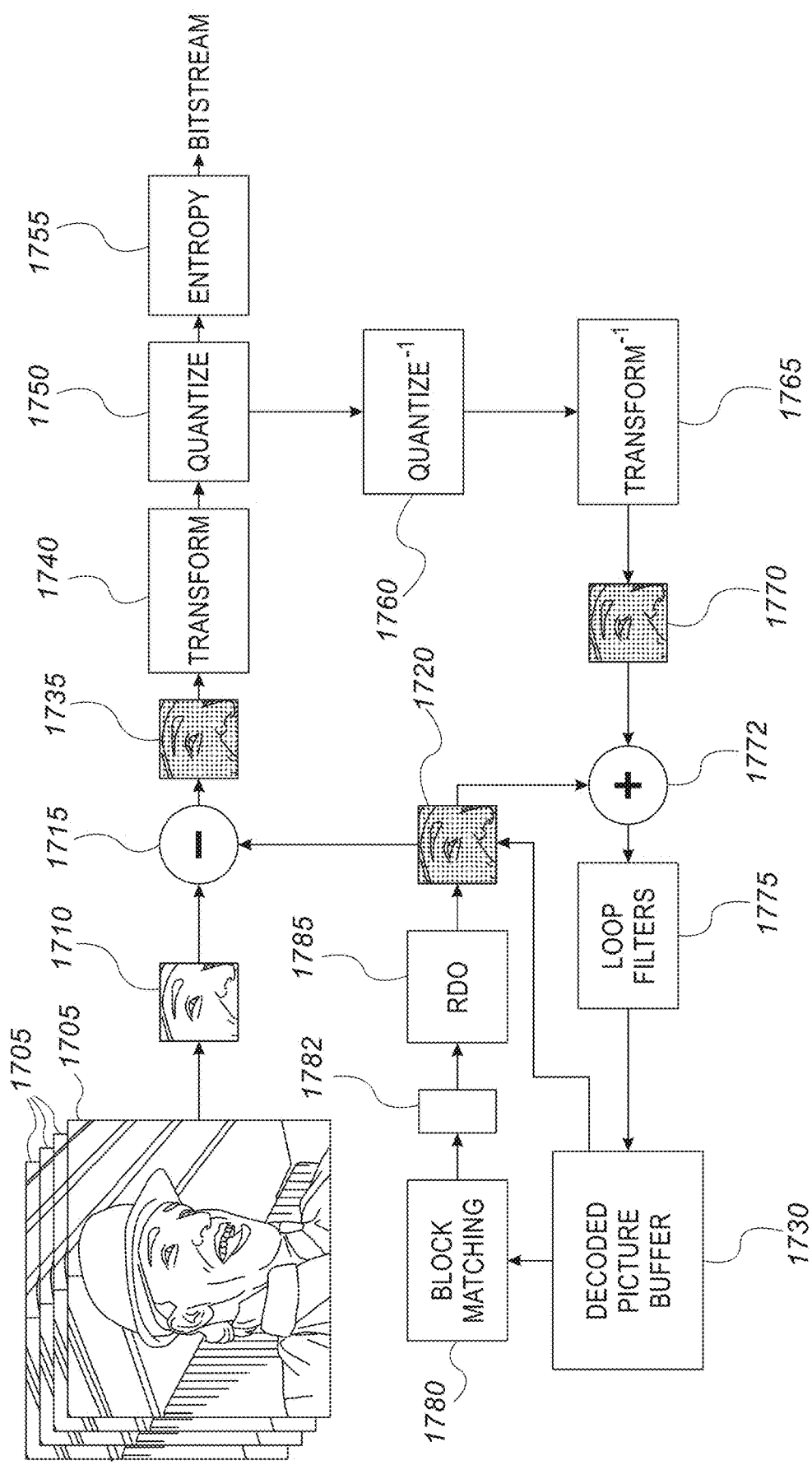
FIG. 17B is a simplified partly pictorial, partly block-diagram illustration depicting an exemplary system and process, including motion estimation, for producing a bitstream, including use of an exemplary embodiment of the acceleration system of FIG. 1B.

Reference is now made to FIG. 17B, which is a simplified partly pictorial, partly block-diagram illustration depicting an exemplary system and process, including motion estimation, for producing a bitstream, including use of an exemplary embodiment of the acceleration system of FIG. 1B. In the exemplary system and process of FIG. 17B, the motion estimation unit 1725 (FIG. 17A) has been replaced with a block matching unit 1780, instantiated in a video acceleration device such as the video acceleration device 120 of FIG. 1B. Other elements of FIG. 17B, having like numbers to elements in FIG. 17A, may be similar thereto.

The block matching unit 1780 produces a result map 1782, which may be similar to the result map 140 of FIG. 1B, and which is sent to an RDO (rate distortion optimization unit) 1785, whose function is to choose (in accordance with an applicable metric) a best reference block and partition, with a goal of having bit stream length at the end of the process match a target bitrate, with maximal available quality. In accordance with the above-mentioned discussion, the RDO 1785, along with the elements which are common between FIGS. 17A and 17B, are SW elements as explained above.

In order to elucidate further the above discussion of certain goals of certain exemplary embodiments of the present invention, the following describes a sense in which exemplary embodiments of an acceleration device described herein is "codec agnostic" or a "generic device"

Agnostic (1)

Figure 16:
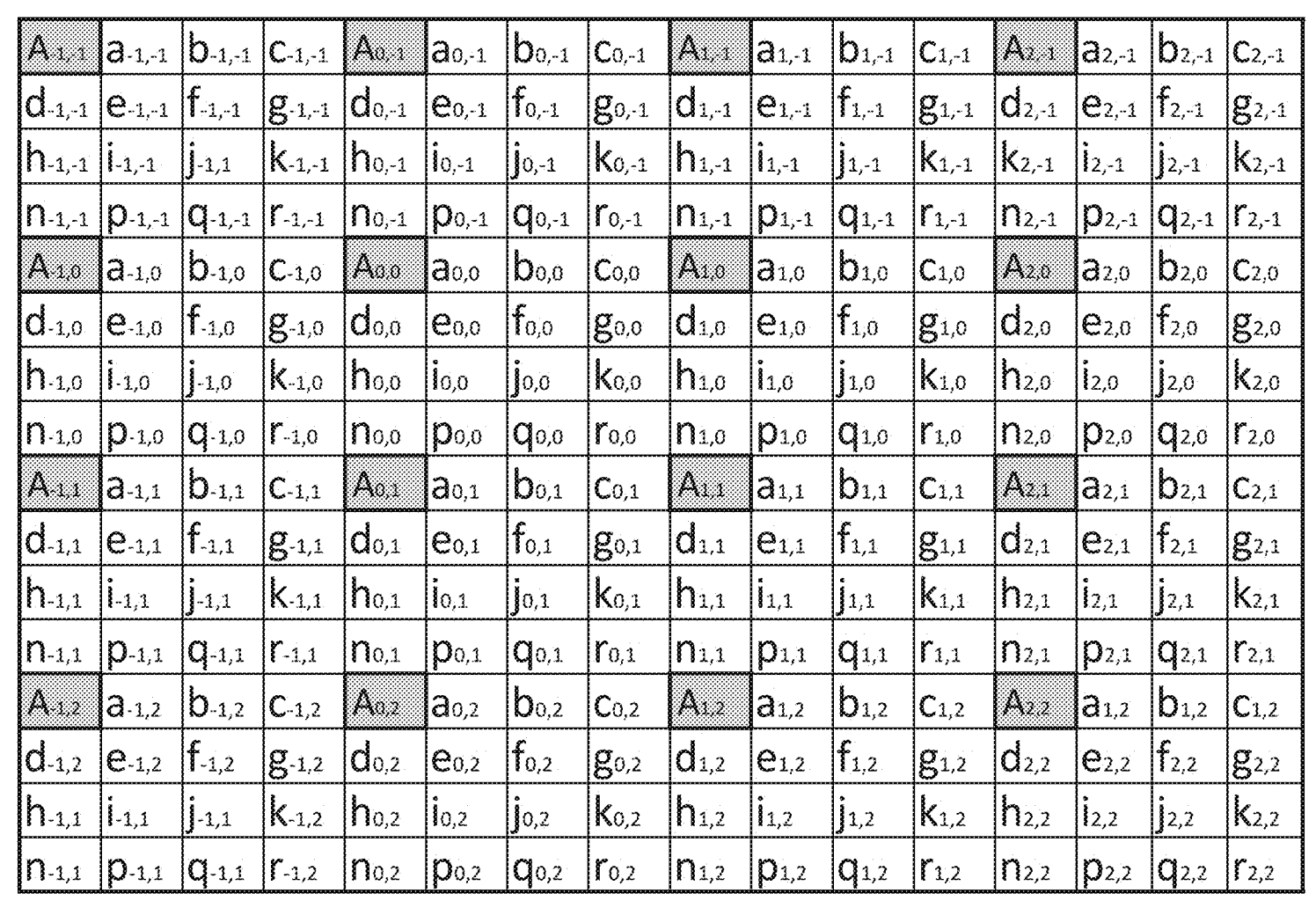

In exemplary embodiments of the present invention, the problem of motion vector resolution described above is overcome by allowing device configuration, in the case of any particular coding standard, to (by way of one non-limiting example) limit the search to full pixels and half pixels, as appropriate for that standard. The difference in the kernel coefficient of sub pixels described above is overcome by allowing SW to configure the kernel coefficient. This coefficient does not generally change "on the fly"; even though the coefficient/coefficients are codec dependent, they are fixed for the entire video stream. It is also appreciated that video encodings may differ in motion vector resolution which is allowed in describing the bit stream; by way of non-limiting example, some may allow ¼ pixel resolution, while some may allow higher resolution (less than/pixel, such as, for example, ⅛ pixel). Encodings may also differ in a way in which sub pixel samples are defined by interpolation of neighboring pixels using known and fixed coefficients; the coefficients being also termed herein "kernel". For each block, the acceleration device may produce (by way of particular non-limiting example, in the case of ¼ size pixels) sixteen sub-blocks, each of which represent different fractional motion vectors. Reference is now made to FIG. 16, which is a simplified pictorial illustration depicting a non-limiting example of pixel sub blocks.

In FIG. 16, each shaded rectangle (such as, by way of non-limiting example, rectangle $A_{1,0}$) represents the upper-left-hand corner of a pixel, while the nearby non-shaded rectangles (in the example of shaded rectangle $A_{1,0}$, an additional fifteen rectangles ($a_{1,0}$; $b_{1,0}$; $C_{1,0}$; $d_{1,0}$; $e_{1,0}$; $f_{1,0}$; $g_{1,0}$; $h_{1,0}$; $i_{1,0}$; $j_{1,0}$; $k_{1,0}$; $n_{1,0}$; $p_{1,0}$; $q_{1,0}$; and $r_{1,0}$)) represent additional sub-blocks of the pixel, for a total of sixteen rectangles (sub-blocks). In general, in preferred embodiments of the present invention, the kernel may be configured as an input.

(2)

Different video encodings also differ in compensation, meaning that the representation of the residual block 1735 of FIG. 17A and FIG. 17B, is done differently in different video encodings. In exemplary embodiments of the present invention, the estimation (which block is probably best) is separated from the compensation (how to express the difference between a given block in a reference frame and in a target frame), which in previous systems were computed together. Thus, in distinction to previous systems, in exemplary embodiments of the present invention the SW will calculate the residual (what remains after compensation), but not the estimation. In certain embodiments it may be that different score functions are implemented in the acceleration device (such as the video acceleration device 120 of FIG. 1B) thus allowing SW to choose one of them to be used. The following is a non-limiting list of exemplary score functions, which functions are known in the art: SAD (Sum of Absolute Difference); and SSE (Sum of Square Error).

(3)

Some encoding standards allow compensating blocks against a weighted image, meaning that a reference frame (previously decoded frame) is multiplied by a factor. (rational number). Alternatively, a sum of 2 reference frames may each be multiplied by a different weighting factor. The acceleration device, in preferred embodiments of the present invention, may either allow configuring a weighting factor for each reference frame, or may receive as input an already weighted frame.

Reference is now additionally made to FIG. 6, which is another simplified tabular illustration depicting an exemplary result of operations performed by an acceleration device in accordance with an exemplary embodiment of the present invention. By way of non-limiting example of a score board, consider a result score board 600 as shown in FIG. 6; in FIG. 6, bold underscore and bold italics are used similarly to their usage in FIG. 5.

"Smart SW" is able to see that two reference frames in the result score board 600 have the same MV (¼/−¼), so the smart SW can itself calculate the compensation of weighted prediction between frame 0 and frame 1, and might thus get a better result than the score board indicates. In the particular example shown, since blocks 0, 1, 2, 3, all have a given score, those blocks can be re-partitioned into one 16×16 block (this being only one particular example, which could, for example, be expandable to larger blocks). The reason for the possibility of achieving a better result is that, by separating functions between an acceleration device and SW as described herein, the SW can use the varied results provided by the acceleration device to potentially find the "bigger picture" and produce a better result.

Turning now to the partitioning issue as described above:

It is believed that the flexible acceleration device output allows the SW to do re-partitioning based on the acceleration device result, as described immediately above.

In certain exemplary embodiments of the present invention, the acceleration device may not necessarily stop the search when reaching a threshold; by contrast, SW algorithms generally have a minimal threshold that causes the SW to stop looking for candidates, which means (by way of non-limiting example) that if the SW found a block with a small residual in the first search try, it will terminate the search process.

In the particular non-limiting case described above, since the partitioning is done later in the process, and as described in the example, in order to avoid inappropriate termination, the acceleration device will complete the search and return a vector of the best results found, in order to allow the SW to do re partitioning. Re-partitioning is discussed in more detail above with reference to FIG. 5.

Aggregation Towards Larger Blocks

The acceleration device also, in exemplary embodiments, provides matching scores for adjacent blocks (blocks that are "upper" and "left", by way of non-limiting example, relative to a given block) in order to allow aggregation to take place efficiently. In exemplary embodiments, the aggregation is done when adjacent blocks has the same displacement vector, with a bigger block which is aggregated to replace the adjacent blocks having a matching result which is the sum of the score of the sub blocks, since the score function is additive.

Avoiding Local Minimum

Figure 7:
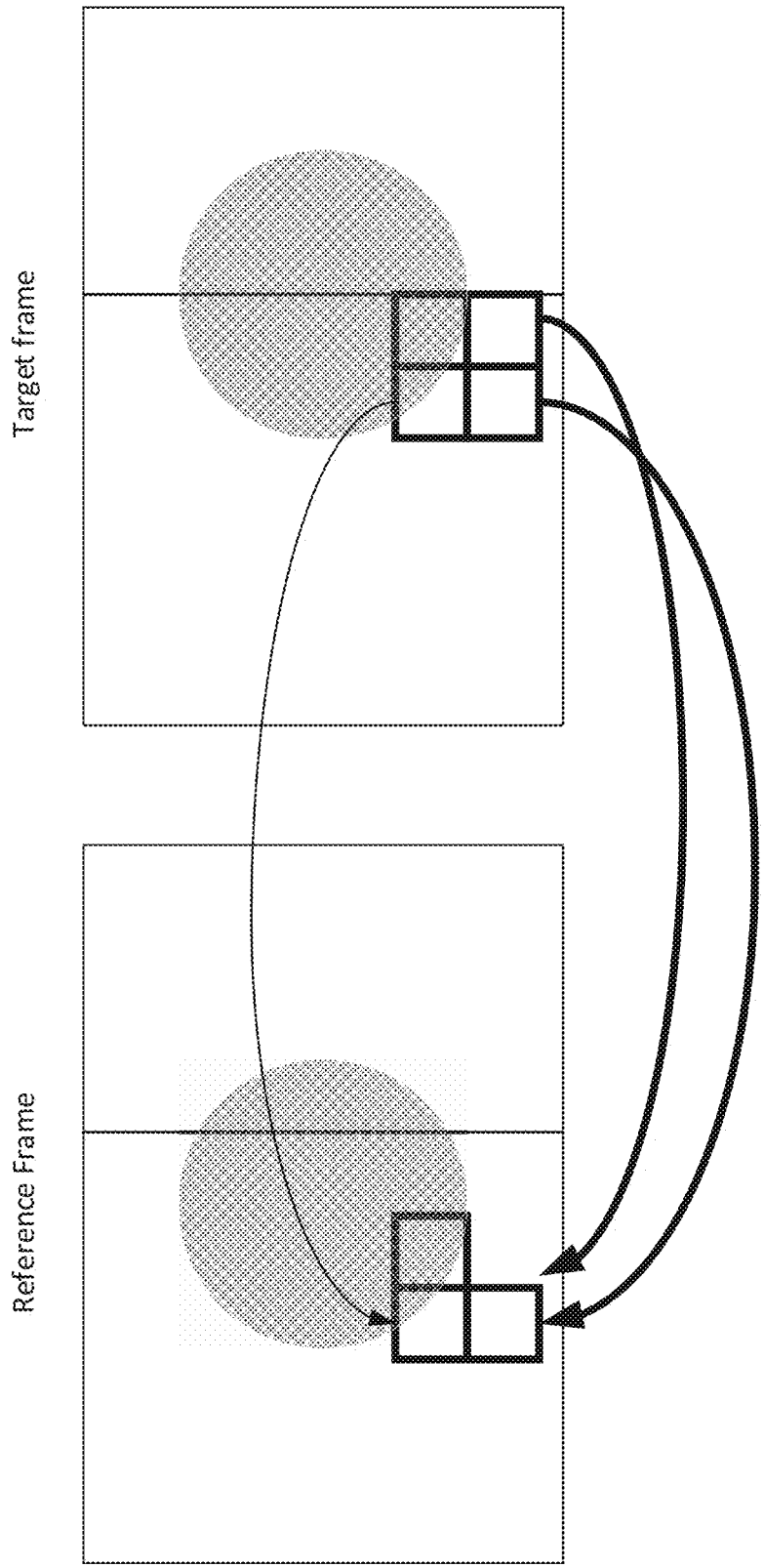
FIG. 7 is a simplified pictorial illustration depicting a "local minimum" problem that may be encountered by an exemplary system in accordance with an exemplary embodiment of the present invention.

Reference is now additionally made to FIG. 7, which is a simplified pictorial illustration depicting a "local minimum" problem that may be encountered by an exemplary system in accordance with an exemplary embodiment of the present invention When searching on small blocks, it may happen that the search algorithm will "fall" into a local minimum, as shown in FIG. 7. Local minimum in this context refers to a small block which may have a very good match (even a perfect match) to a certain region, even though there may exist a match using a much bigger block. Exemplary techniques for overcoming a local minimum problem, using a plurality of block sizes to do so, are discussed below with reference to FIG. 8.

When dealing with small blocks, there is higher chance that many of the small blocks will be similar and the present invention, in exemplary embodiments thereof, will not find the entire area of a larger object. In order to overcome this problem, the acceleration device, in exemplary embodiments, performs a full and hierarchical search over the following so-called predictors:
1. Results of the collocated (the term "collocated" being known in the video art) block/s in one or more previously decoded frames. In exemplary embodiments, using such results is configured by SW. Such results may comprise a P&A map, as described below.
2. Result/s from adjacent block/s, as described above.
3. The result around the global motion vector of the image (that is, the global motion vector is used as a center of a search area), using such result being configured by SW, which may be the case when SW provides such a global motion vector.
4. The result of a low resolution image search, as described below in more detail, including with reference to FIGS. 19-21.

Low Resolution Image Search

Figure 8:
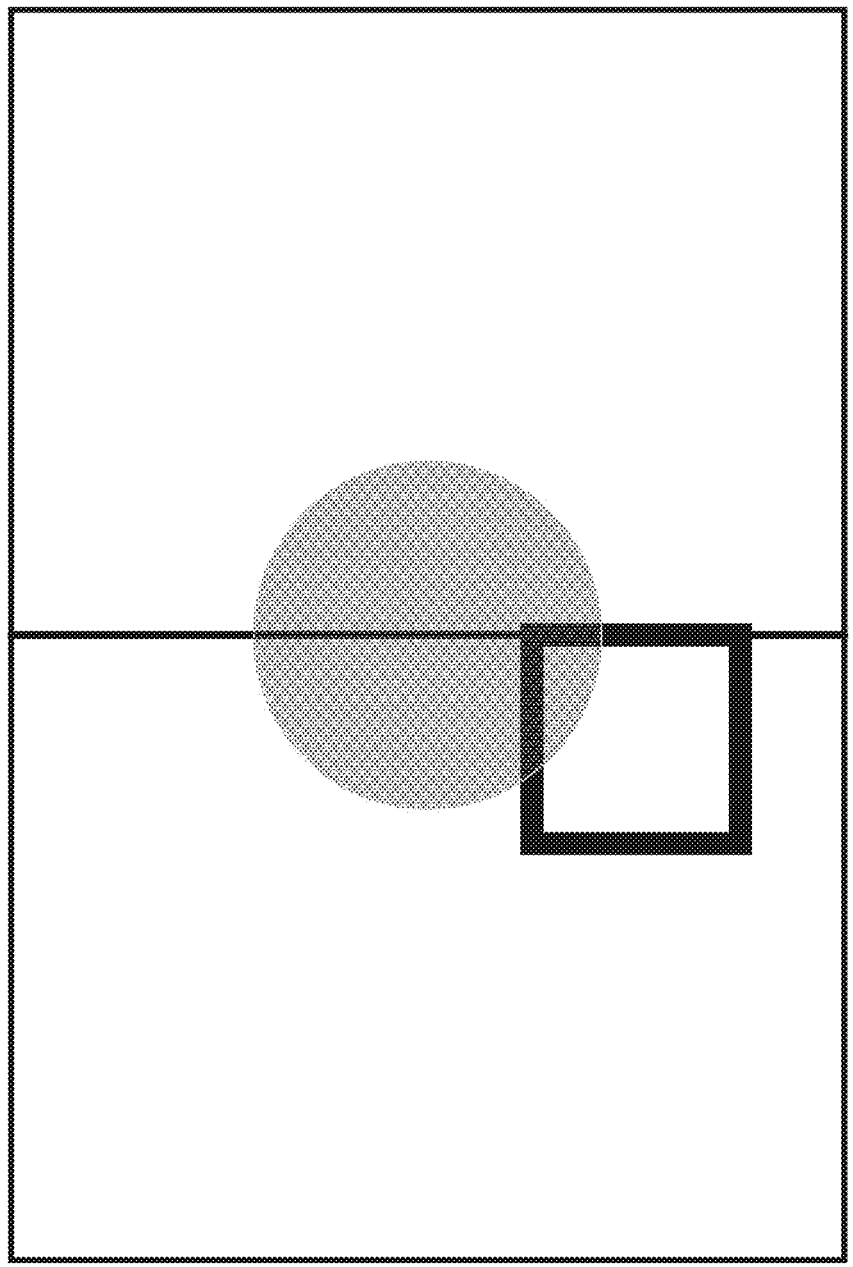
FIG. 8 is a simplified pictorial illustration depicting an operation on a low-resolution image, which operation may be carried out by an exemplary system in accordance with an exemplary embodiment of the present invention.
Figure 9:
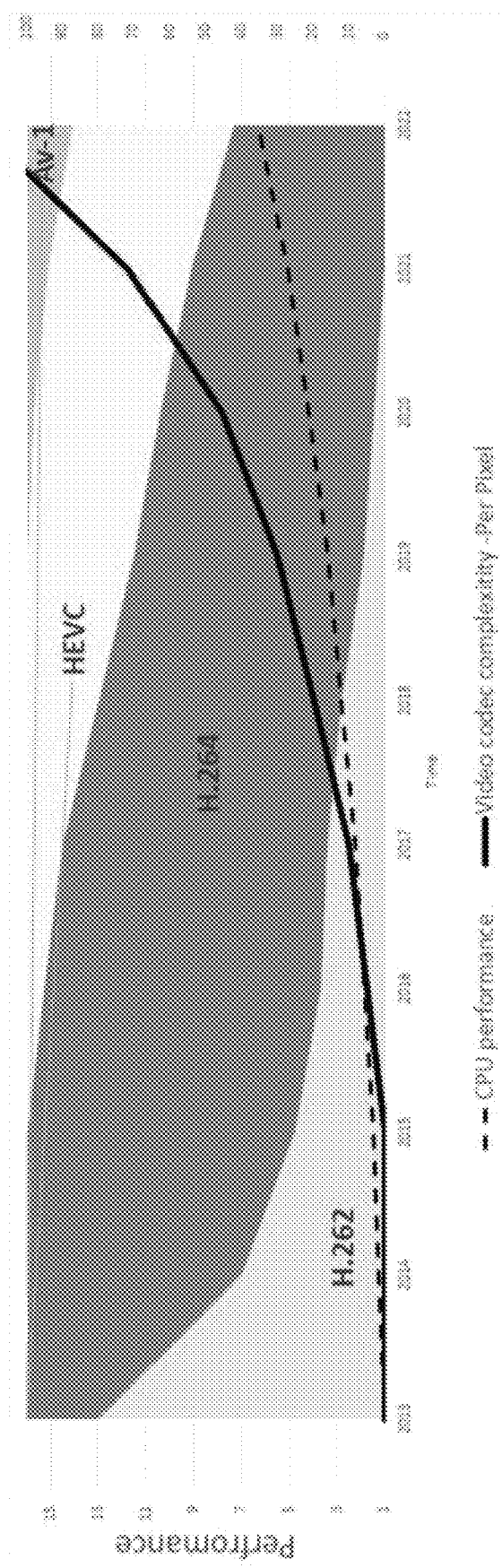
FIG. 9 is a simplified graphical illustration depicting a relationship between CPU power and various encoding tasks.
Figure 10:
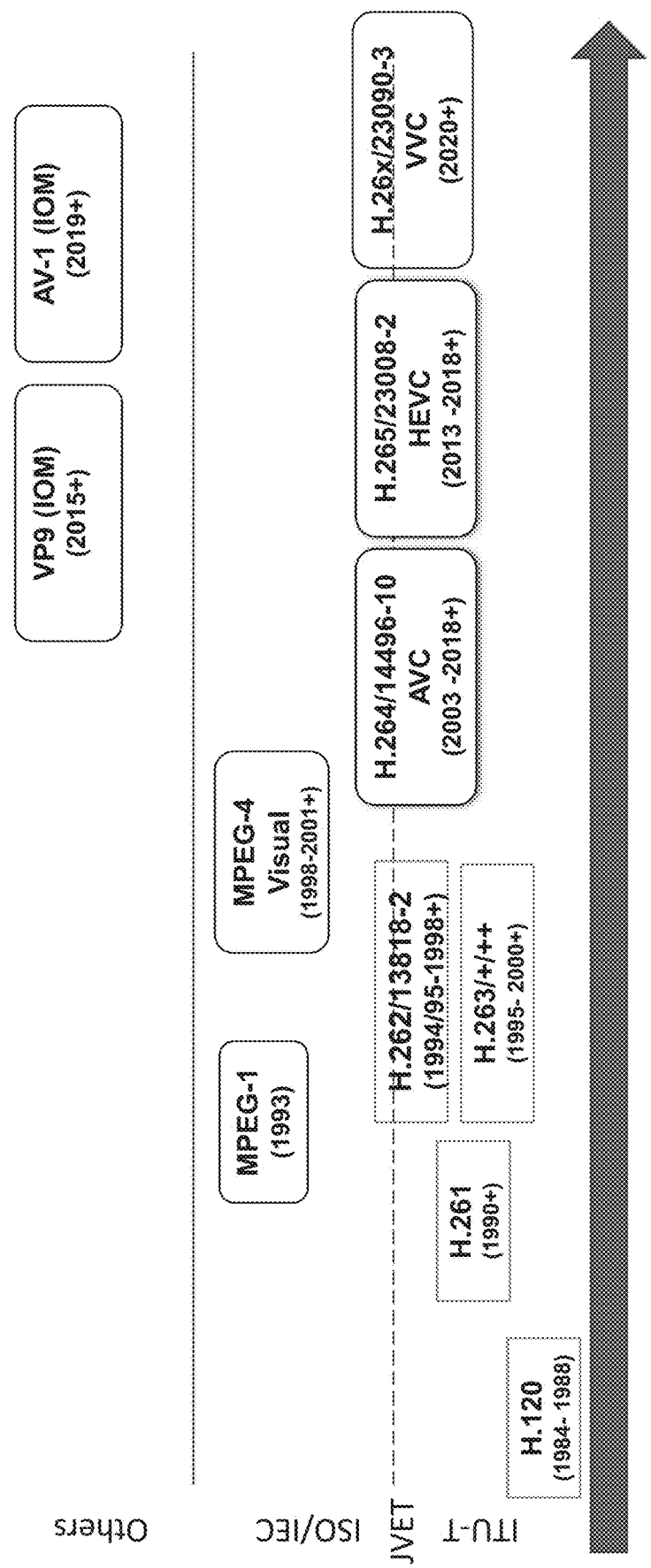
FIG. 10 is a simplified pictorial illustration depicting an approximate timeline view of various past, present, and future encoding standards.
Figure 12:
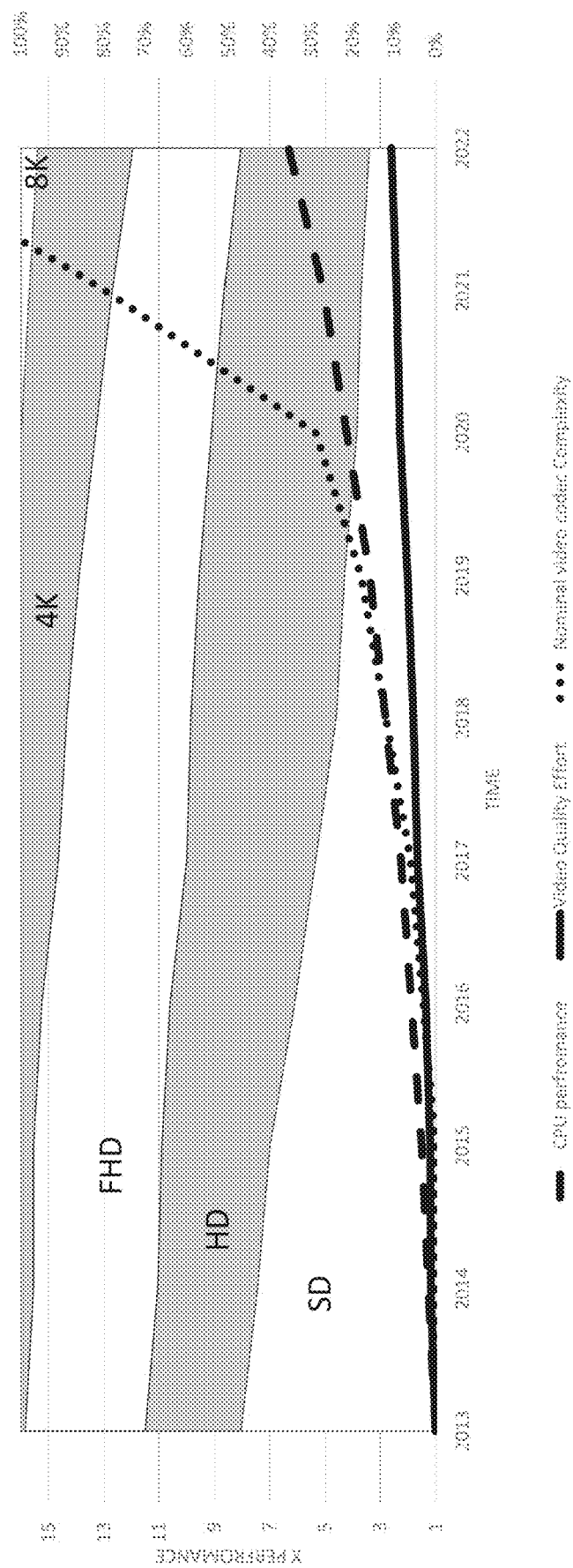
FIG. 12 is a simplified partly pictorial, partly graphical illustration depicting relationships between resolution and complexity.
Figure 13:
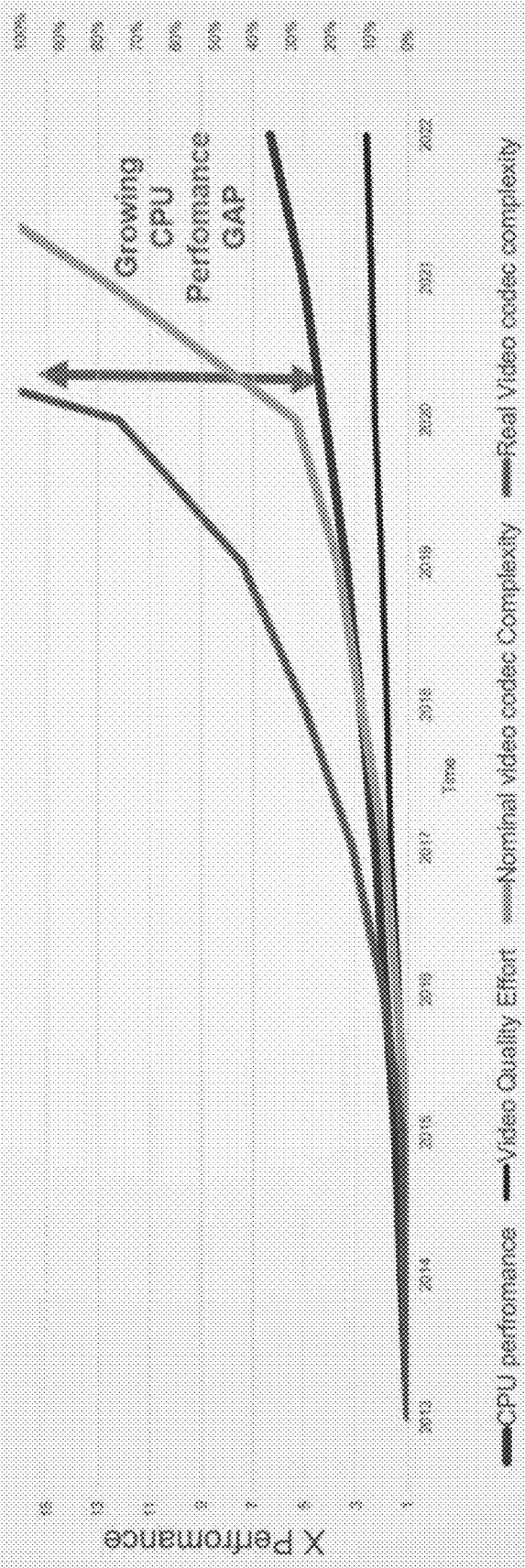
FIG. 13 is a simplified graphical illustration depicting relationships between video complexity, CPU capability, and computational effort.

Reference is now additionally made to FIG. 8, which is a simplified pictorial illustration depicting an operation on a low resolution image, which operation may be carried out by an exemplary system in accordance with an exemplary embodiment of the present invention. In the low resolution search technique, resolution of the image is reduced (the picture is made smaller), such as, by way of non-limiting example, by a factor of 4 in each dimension. In an exemplary embodiment, searching and motion estimation are then performed on the reduced resolution image, as shown in FIG. 8. In the non-limiting example of reduction by a factor of 4, in the reduced resolution image of FIG. 8 an 8×8 block represents a 64×64 block in the original image; persons skilled in the art will appreciate that there is less noise in such a reduced resolution image than in the original image. Thus, a candidate anchor identified in the reduced resolution image will allow us to look for a larger anchor in the full-resolution partition.

It is appreciated that, in embodiments of the present invention, the acceleration device returns the best result of each anchor, and sometimes the second best result, and not the total ranking score.

Figure 18:
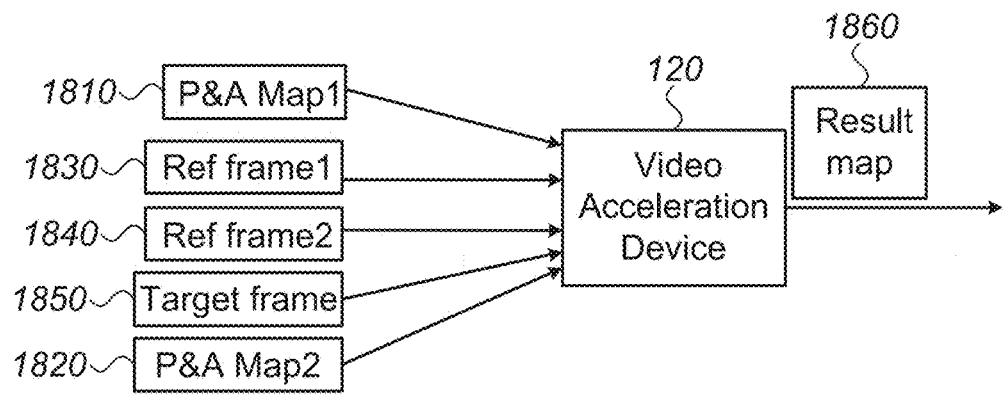
FIG. 18 is a simplified block diagram illustration depicting a particular exemplary case of using the acceleration system of FIG. 1B.

Reference is now made to FIG. 18, which is a simplified block diagram illustration depicting a particular exemplary case of using the acceleration system of FIG. 1B. FIG. 18 depicts an exemplary case in which a single pass is executed in order to obtain a result; in general, whether a single pass or multiple passes are used is decided by SW. Other exemplary cases, in which more than a single pass may be executed, are described below.

In FIG. 18, the video acceleration device 120 of FIG. 1B is shown receiving the following inputs:
- a first prediction and aggregation (P&A) map 1810;
- a second P&A map 1820, which may refer to a second reference frame (such as the second reference frame 1840 mentioned below);
- a first reference frame 1830;
- a second reference frame 1840; and
- a target frame 1850.

The first reference frame 1830, second reference frame 1840, and the target frame 1850 will be understood in light of the above discussion.

The first P&A map 1810 and the second P&A map 1820 may be similar in form to the result map 140 of FIG. 1B, or, by way of very particular non-limiting example, to the result map 500 of FIG. 5. In general, the first P&A map 1810 and the second P&A map 1820:
- may be optional;
- are provided by SW; and
- are provided with a deliberately poor score, since it is believed that providing a poor score will lead to a better result.

The video acceleration device 120 produces a result map 1860 which may be similar in form to the result map 140 of FIG. 1B, or, by way of very particular non-limiting example, to the result map 500 of FIG. 5.

The above description of FIG. 18 may be further elaborated on as follows. In general, one or more reference frames and one or more target frames are received as input. A plurality of P&A maps may be received; by way of one particular non-limiting example, when two reference frames and two target frames are received, up to four P&A maps may be received. In general, a given P&A map refers to a reference frame paired with a target frame, so that if there are two reference frames and two target frames, there would be four P&A maps to cover the applicable pairings. In a case where a particular P&A map is blank, this may be an indication to the video acceleration device 120 to search without any additional information as to where to search. In general, a P&A map provides predication and aggregation points to aid the video acceleration device 120 in searching related to each target.

Figure 19:
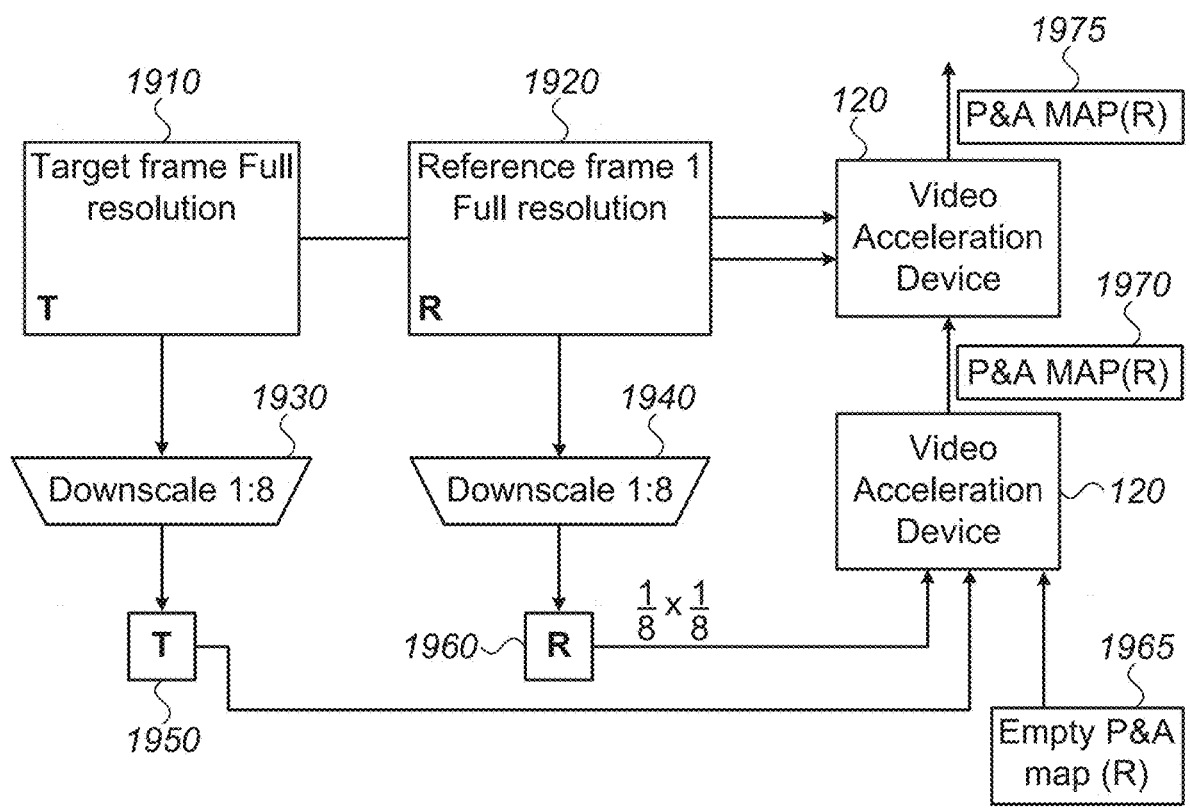
FIG. 19 is a simplified block diagram illustration depicting another particular exemplary case of using the acceleration system of FIG. 1B.

Reference is now made to FIG. 19, which is a simplified block-diagram illustration depicting another particular exemplary case of using the acceleration system of FIG. 1B. FIG. 19 depicts an exemplary case in which a two passes executed in order to obtain a result; in general, whether a single pass or multiple passes are used is decided by SW. The two passes depicted in FIG. 19 use downscaling, which is intended to assist in avoiding a local minimum, as described above.

In FIG. 19, a full resolution target frame 1910 and a full resolution reference frame 1920 are provided as input. Each of the full resolution target frame 1910 and the full resolution reference frame 1920 are downscaled at downscale units 1930 and 1940 respectively (which for sake of simplicity of depiction and explanation are shown as separate units, it being appreciated that alternatively a single downscale unit may be used to carry out multiple downscale operations). In the particular non-limiting example shown in FIG. 19 the downscale units 1930 and 1940 are shown as downscaling by a factor of 1:8, but it is appreciated that the example of 1:8 is not meant to be limiting.

The output of the downscale unit 1930 is a downscaled target frame 1950. The output of the downscale unit 1940 is a downscaled reference frame 1960. The downscaled target frame 1950 and the downscaled reference frame 1960 are input into the video acceleration device 120. Two instances of the video acceleration device 120 are shown in FIG. 19 for ease of depiction and acceleration, it being appreciated that only a single video acceleration device 120 may be used.

By way of non-limiting example, an empty P&A map 1965 (see description of P&A maps above, with reference to FIG. 18) is also input into the video acceleration device 120. The video acceleration device 120 which receives the downscaled target frame 1950 and the downscaled reference frame 1960 produces a P&A map(R) 1970, "R" designating that the map relates to a reference frame, representing the best downscaled result found for the downscaled target frame 1950 in the downscaled reference frame 1960.

Meanwhile, the full resolution target frame 1910 and the full resolution reference frame 1920 are each provide as input to the video acceleration device 120, which also receives the P&A map(R) 1970, an which produces a second P&A map(R) 1975. It is appreciated that, when a method such as that depicted in FIG. 19 is used, so that in addition to a full search on an entire frame a downscaled search is used, information is produced which may assist in finding larger blocks (such as, by way of non-limiting example, 64×64 blocks). This may be because, in effect, the system has "zoomed in" on each frame, so that more of each frame will be in an effective search area.

Figure 20:
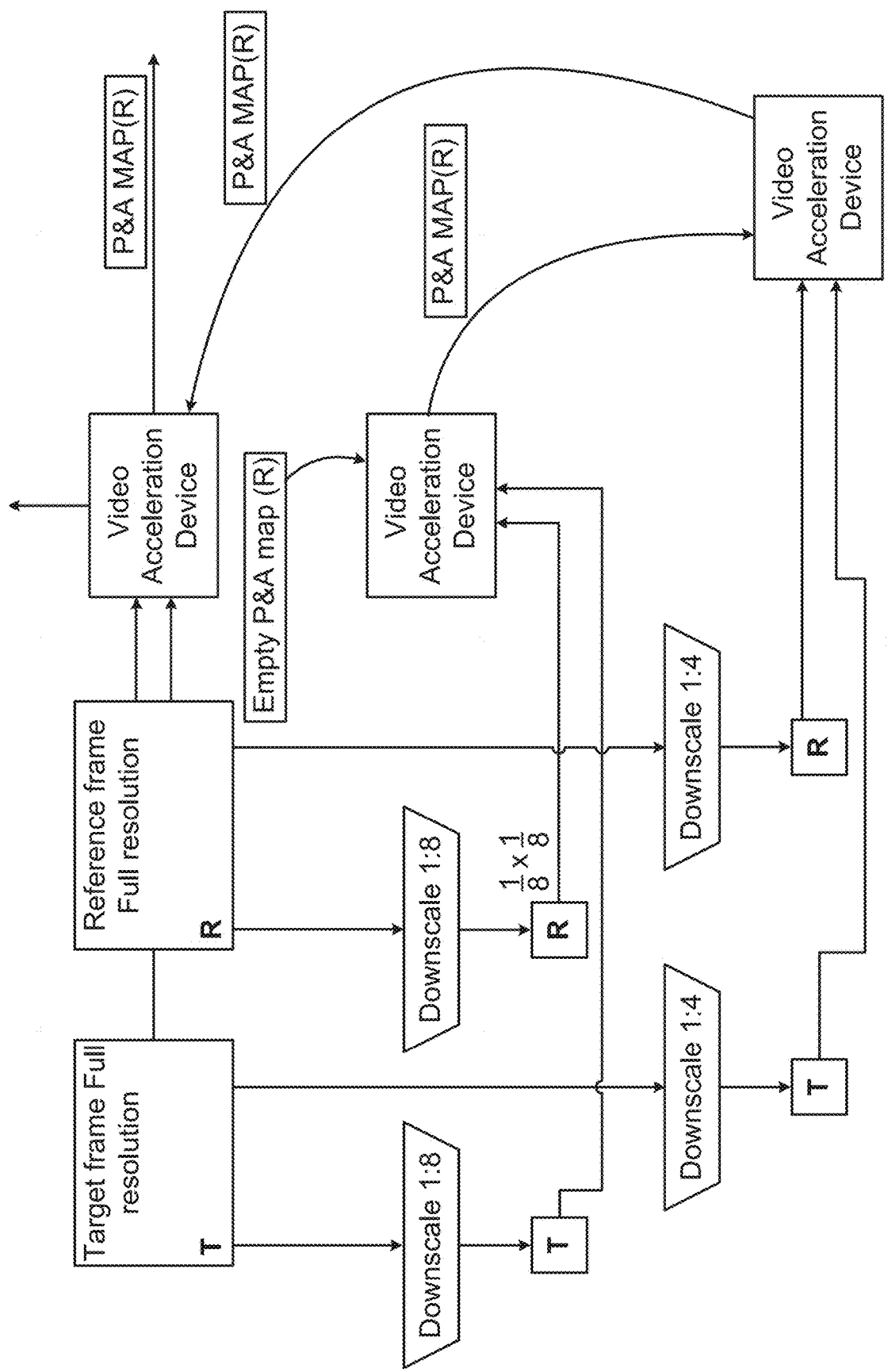
FIG. 20 is a simplified block diagram illustration depicting still another particular exemplary case of using the acceleration system of FIG. 1B.
Figure 21:
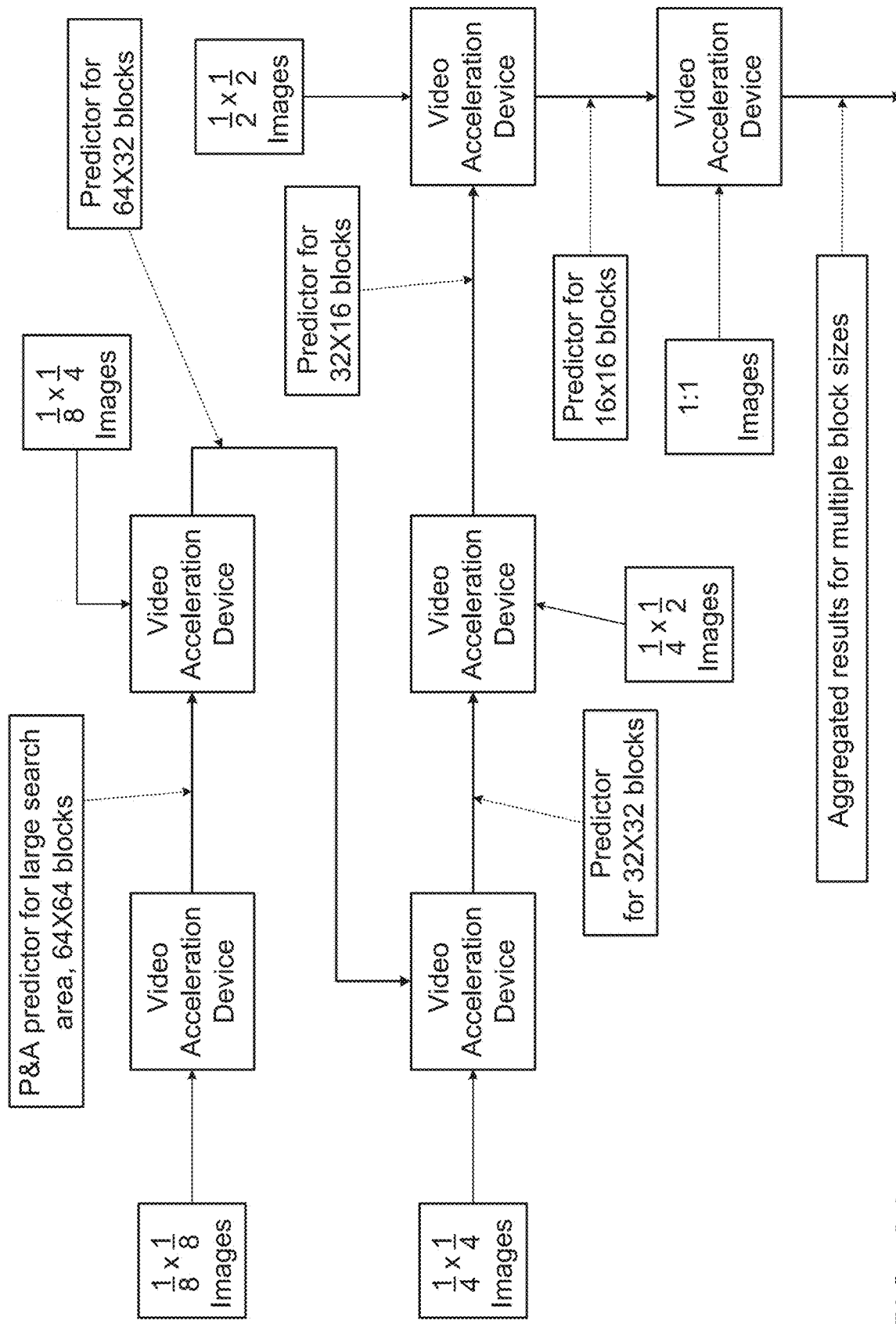
FIG. 21 is a simplified block diagram illustration depicting yet another particular exemplary case of using the acceleration system of FIG. 1B.

Reference is now made to FIG. 20, which is a simplified block-diagram illustration depicting still another particular exemplary case of using the acceleration system of FIG. 1B, and to FIG. 21, which is a simplified block-diagram illustration depicting yet another particular exemplary case of using the acceleration system of FIG. 1B. FIGS. 20 and 21 will be understood with reference to the above description of FIG. 19. FIG. 20 depicts a situation in which 1:4 and 1:8 downscaling are both used and are combined. FIG. 21 depicts a situation in which both symmetrical and asymmetrical downscaling are used and combined. In general, in the situations depicted in FIGS. 20 and 21, the "quality" of output of the video acceleration device 120 may be improved, with little additional work expended in a few additional passes.

Figure 22:
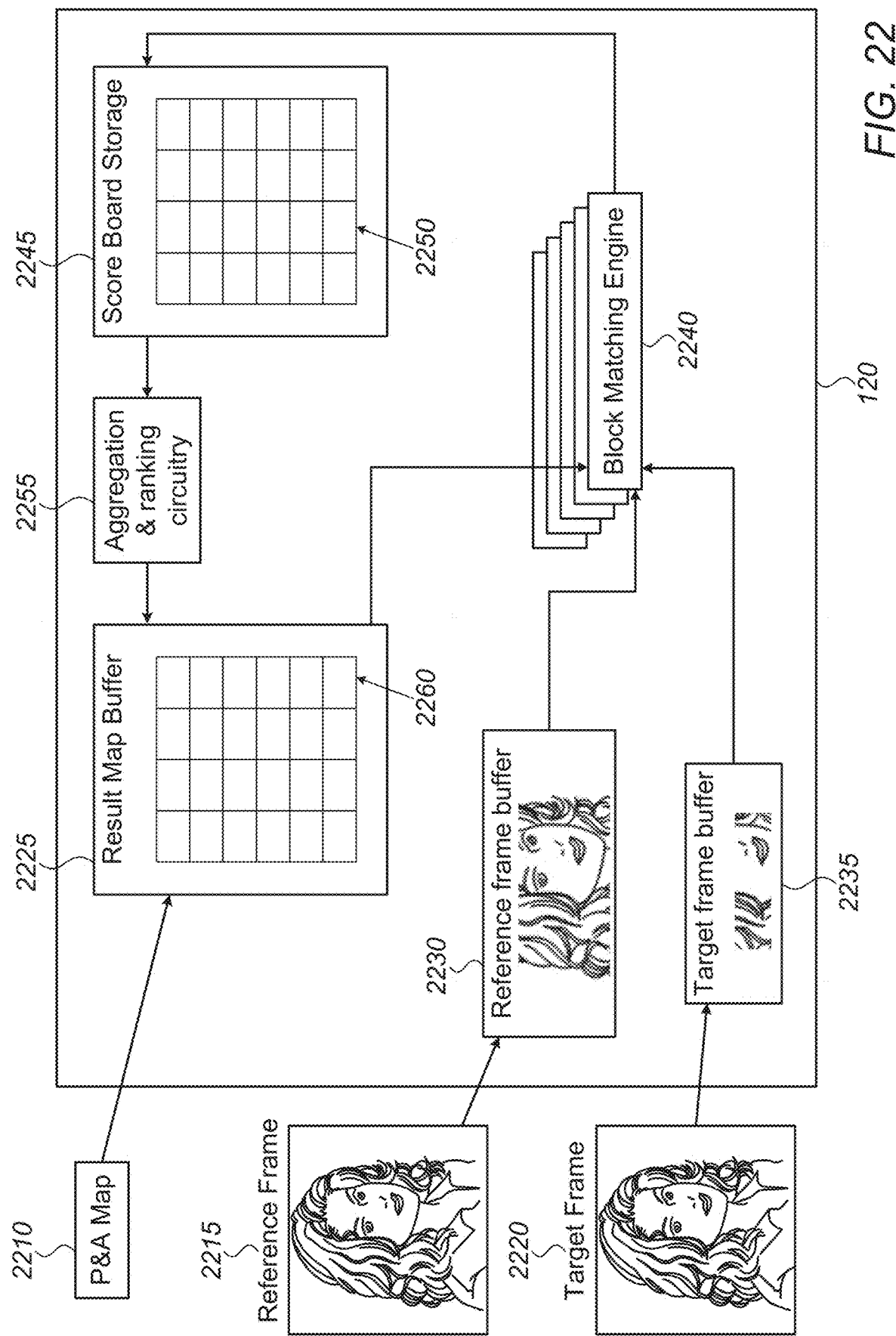
FIG. 22 is a simplified partly pictorial, partly block diagram illustration of an exemplary embodiment of a portion of the application acceleration system of FIG. 1B.

Reference is now made to FIG. 22, which is a simplified partly pictorial, partly block diagram illustration of an exemplary embodiment of a portion of the application acceleration system of FIG. 1B. FIG. 22 depicts a particular exemplary non-limiting embodiment of the video acceleration device 120 of FIG. 1B.

The video acceleration device 120 of FIG. 22 is shown receiving as input: a P&A map 2210; a reference frame 2215; and a target frame 2220. Each of the P&A map 2210, the reference frame 2215, and the target frame 2220 may be similar to P&A maps, reference frames, and target frames described above.

The video acceleration device 120 of FIG. 22 comprises the following elements:
- a result map buffer 2225;
- a reference frame buffer 2230;
- a target frame buffer 2235;
- a block matching engine 2240;
- a score board storage unit 2245; and
- aggregation and ranking circuitry 2255.

The result map buffer 2260 is shown as storing a map 2260, which may be the input P&A map 2210 or another map, as also described below.

A non-limiting example of operation of the video acceleration device 120 of FIG. 22 is now briefly described:

The target frame 2220 or a relevant portion thereof (typically determined under SW control) is received by the video acceleration device 120, and at least a relevant portion is stored in the target frame buffer 2235. By way of a particular non limiting example, the relevant portion could comprise a current block of 8×8 pixels to be searched.

The reference frame 2215 or a relevant portion thereof is received by the video acceleration device 120, and a relevant search area (which may be a search area around the current block in the target frame) is stored in the reference frame buffer 2230.

The block matching engine 2240 (which may comprise a plurality of block matching engines, in order to execute more than one operation in parallel) receives current block stored in the target frame buffer 2235 and the relevant blocks stored in the reference frame buffer 2230. The block matching engine determines a score (using, by way of non-limiting example as described above, SAD or SSE), and writes the score to the score board storage unit 2245, producing a score board 2250. Score boards are described above; one particular non-limiting example is the score board 500 of FIG. 5, described above.

In certain exemplary embodiments, the block matching engine may use the P&A map 2210 (which may be stored in the result map buffer 2225, or elsewhere in the video acceleration device 120) to "focus" score determination on blocks indicated in the P&A map 2210, and blocks in proximity to those blocks.

The aggregation and ranking circuitry 2255 is configured, in exemplary embodiments, to determine the best results from the score board 2250, and also to determine large blocks by aggregation, using (by way of non-limiting example) sums of values of adjacent blocks, which blocks have the same displacement vector as a given block, in order to produce an output score board/result map 2260. While not shown in FIG. 22, the output score board/result map is generally provided as output from the video acceleration device 120, as described above.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system for video encoding, comprising:
   an acceleration device, to select from a video stream a target video frame and one or more reference frames to be applied in encoding the target video frame, to divide the target video frame into multiple blocks, and to compute a result map, which comprises multiple entries for each block in the target video frame, the entries comprising respective motion vectors between the block and corresponding blocks in the one or more reference frames and respective reference scores for the motion vectors; and
   a control unit, to encode the target video frame based on at least one of the reference frames by selecting the motion vectors from the result map responsively to the reference scores.

2. The system according to claim 1, wherein the control unit is to encode the video stream, using the motion vectors and the result map, in accordance with a plurality of different video codecs.

3. The system according to claim 2, wherein at least one of the video codecs complies with an encoding standard selected from a group of standards consisting of HEVC/H.265; AVC/H.264; VP9; AV-1; and VVC.

4. The system according to claim 1, wherein the control unit is to encode a plurality of adjacent blocks having equal motion vectors by aggregating the plurality of adjacent blocks into a larger block.

5. The system according to claim 4, wherein the control unit is to set a motion vector of the larger block equal to the respective motion vectors of the plurality of adjacent blocks and to set a reference score of the larger block equal to a sum of the respective reference scores of the plurality of adjacent blocks.

6. The system according to claim 1, wherein the acceleration device is to compute the respective motion vectors in one or more of the entries in the result map by sub-pixel interpolation.

7. The system according to claim 6, wherein the control unit is to encode at least some of the blocks using fractional motion vectors.

8. The system according to claim 1, wherein the entries in the result map that are computed by the acceleration device for a given target video frame comprise at least first and second entries referring to different, first and second reference frames.

9. The system according to claim 1, wherein the acceleration device is to compute the entries in the result map using a prediction and aggregation map for each reference frame paired with the target video frame.

10. The system according to claim 9, wherein the acceleration device is to downscale the reference frame and the target video frame, to compute the prediction and aggregation map by matching the blocks in the downscaled reference frame and downscaled target video frame, and to apply the computed prediction and aggregation map in computing the entries in the result map for the reference frame and target video frame at full resolution.

11. The system according to claim 10, wherein the acceleration device is to compute multiple prediction and aggregation maps for different downscaling factors.

12. A method for video encoding, comprising:
- selecting from a video stream a target video frame and one or more reference frames to be applied in encoding the target video frame;
- dividing the target video frame into multiple blocks;
- computing, by an acceleration device, a result map, which comprises multiple entries for each block in the target video frame, the entries comprising respective motion vectors between the block and corresponding blocks in the one or more reference frames and respective reference scores for the motion vectors; and
- encoding the target video frame, by a control unit, based on at least one of the reference frames by selecting the motion vectors from the result map responsively to the reference scores.

13. The method according to claim 12, wherein encoding the target video frame comprises encoding the video stream, using the motion vectors and the result map, in accordance with a plurality of different video codecs.

14. The method according to claim 13, wherein at least one of the video codecs complies with an encoding standard selected from a group of standards consisting of HEVC/H.265; AVC/H.264; VP9; AV-1; and VVC.

15. The method according to claim 12, wherein encoding the target video frame comprises encoding a plurality of adjacent blocks having equal motion vectors by aggregating the plurality of adjacent blocks into a larger block.

16. The method according to claim 15, wherein encoding the plurality of adjacent blocks comprises setting a motion vector of the larger block equal to the respective motion vectors of the plurality of adjacent blocks and setting a reference score of the larger block equal to a sum of the respective reference scores of the plurality of adjacent blocks.

17. The method according to claim 12, wherein computing the result map comprises computing the respective motion vectors in one or more of the entries in the result map by sub-pixel interpolation.

18. The method according to claim 17, wherein computing the result map comprises encoding at least some of the blocks using fractional motion vectors.

19. The method according to claim 12, wherein the entries in the result map that are computed by the acceleration device for a given target video frame comprise at least first and second entries referring to different, first and second reference frames.

20. The method according to claim 12, wherein computing the result map comprises computing the entries using a prediction and aggregation map for each reference frame paired with the target video frame.

21. The method according to claim 20, wherein computing the entries comprises:
- downscaling the reference frame and the target video frame;
- computing the prediction and aggregation map by matching the blocks in the downscaled reference frame and downscaled target video frame; and
- applying the computed prediction and aggregation map in computing the entries in the result map for the reference frame and target video frame at full resolution.

22. The method according to claim 21, wherein computing the prediction and aggregation map comprises computing multiple prediction and aggregation maps for different downscaling factors.

* * * * *